U S011457290B2

United States Patent
Navali et al.

(10) Patent No.: US 11,457,290 B2
(45) Date of Patent: Sep. 27, 2022

(54) SYSTEM AND METHOD FOR WATERMARKING OF MEDIA SEGMENTS USING SAMPLE VARIANTS FOR NORMALIZED ENCRYPTION (SVNE)

(71) Applicant: TELEFONAKTIEBOLAGET LM ERICSSON (PUBL), Stockholm (SE)

(72) Inventors: Prabhudev Navali, Westford, MA (US); Raj Nair, Lexington, MA (US); Pablo Argon, Redmond, WA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 325 days.

(21) Appl. No.: 16/482,486

(22) PCT Filed: Feb. 22, 2018

(86) PCT No.: PCT/IB2018/000210
§ 371 (c)(1),
(2) Date: Jul. 31, 2019

(87) PCT Pub. No.: WO2018/154381
PCT Pub. Date: Aug. 30, 2018

(65) Prior Publication Data
US 2020/0014988 A1 Jan. 9, 2020

Related U.S. Application Data

(60) Provisional application No. 62/463,473, filed on Feb. 24, 2017.

(51) Int. Cl.
*H04N 21/2347* (2011.01)
*H04N 21/20* (2011.01)
(Continued)

(52) U.S. Cl.
CPC ..... *H04N 21/8358* (2013.01); *H04N 21/2347* (2013.01); *H04N 21/234309* (2013.01);
(Continued)

(58) Field of Classification Search
CPC .......................... H04N 21/20; H04N 21/2552
See application file for complete search history.

(56) References Cited

U.S. PATENT DOCUMENTS 9,532,113 B2 * 12/2016 Thorwirth ........ H04N 21/23439
10,236,031 B1 * 3/2019 Gurijala ........... G11B 20/10527
(Continued)

FOREIGN PATENT DOCUMENTS

WO WO2011103364 A1 8/2011

OTHER PUBLICATIONS

ISA/EPO, International Search Report, International Application No. PCT/IB2018/000210, dated Jul. 4, 2018, 4 pgs.
(Continued)

*Primary Examiner* — Mushfikh I Alam
(74) *Attorney, Agent, or Firm* — The Danamraj Law Group, P.C.

(57) ABSTRACT

A system and method for distributing watermarked media content assets wherein a main track of a media content asset is provided with a first watermarking payload and at least one variant track is provided with a second watermarking payload. A plurality of composite segments of the media content asset are generated for distribution, wherein each composite segment includes a portion of the main track and corresponding portion of at least one variant track. The composite segments may be uploaded to a delivery node operative to deliver segments responsive to a unique watermarking signature provided by a client controller operating in conjunction with a watermarking session manager.

9 Claims, 18 Drawing Sheets

(51) Int. Cl.
*H04N 21/8358* (2011.01)
*H04N 21/2343* (2011.01)
*H04N 21/437* (2011.01)
*H04N 21/4405* (2011.01)
*H04N 21/845* (2011.01)

(52) U.S. Cl.
CPC ....... *H04N 21/437* (2013.01); *H04N 21/4405* (2013.01); *H04N 21/8456* (2013.01)

(56) References Cited

U.S. PATENT DOCUMENTS

| | | | | |
|---|---|---|---|---|
| 2013/0219182 | A1* | 8/2013 | Barnes | G06F 21/10 713/176 |
| 2015/0326393 | A1* | 11/2015 | Takashima | H04N 21/8358 380/30 |
| 2017/0171610 | A1* | 6/2017 | Nair | H04N 21/23476 |
| 2018/0184160 | A1* | 6/2018 | Cain | H04N 21/44016 |
| 2018/0191507 | A1* | 7/2018 | Blankenbeckler | G06F 21/72 |
| 2018/0357742 | A1* | 12/2018 | Henry | H04N 19/467 |
| 2019/0373309 | A1* | 12/2019 | Fahnestock | H04N 21/4394 |
| 2020/0169754 | A1* | 5/2020 | Wang | H04N 19/184 |

OTHER PUBLICATIONS

ISA/EPO, Written Opinion of the International Searching Authority, International Application No. PCT/IB2018/000210, dated Jul. 4, 2018, 15 pgs.

Dolan, Michael, Editor's Draft of CD 23001-12, ISO/IEC JTC1/SC29/WG11 MPEG2014/M34960, Oct. 20-24, 2014, Strasbourg, France, 20 pgs.

Navali, Prabhu, Carriage of Sample Variants in MPEG-2 Transport Streams, ISO/IEC JTC1/SC29/WG11 MPEG2016/N16596, Jan. 16-20, 2017, Geneva, Switzerland, 22 pgs.

Navali et al., Sample Variants for Normalized Encryption (SVNE): overview, Mar. 14, 2017, 14 pgs.

Navali et al., WD of ISO/IEC 23001-12 2nd Edition Sample Variants, ISO/IEC JTC1/SC29/WG11 MPEG2017/m41233, Jul. 12, 2017, Torino, Italy, 34 pgs.

* cited by examiner

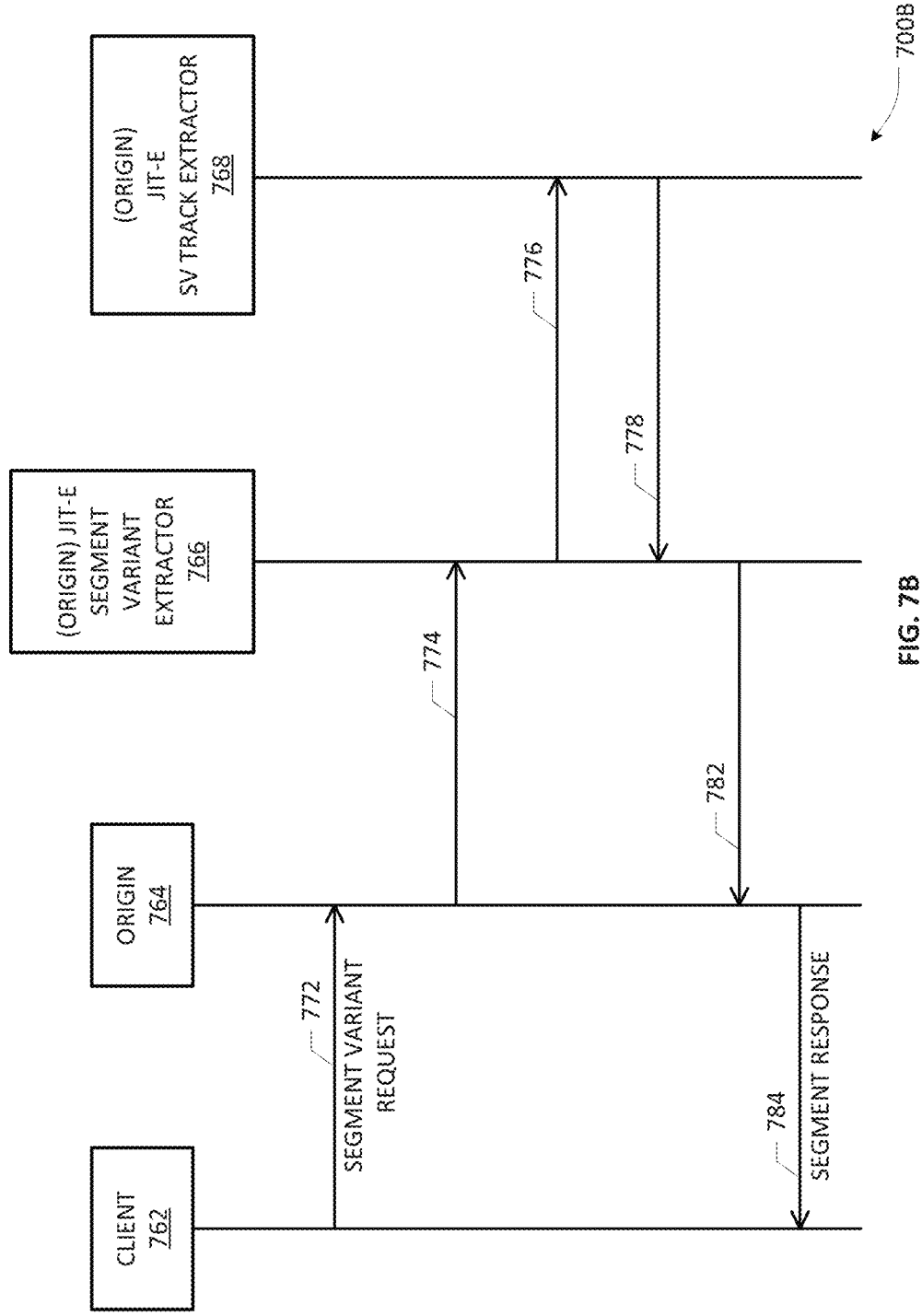

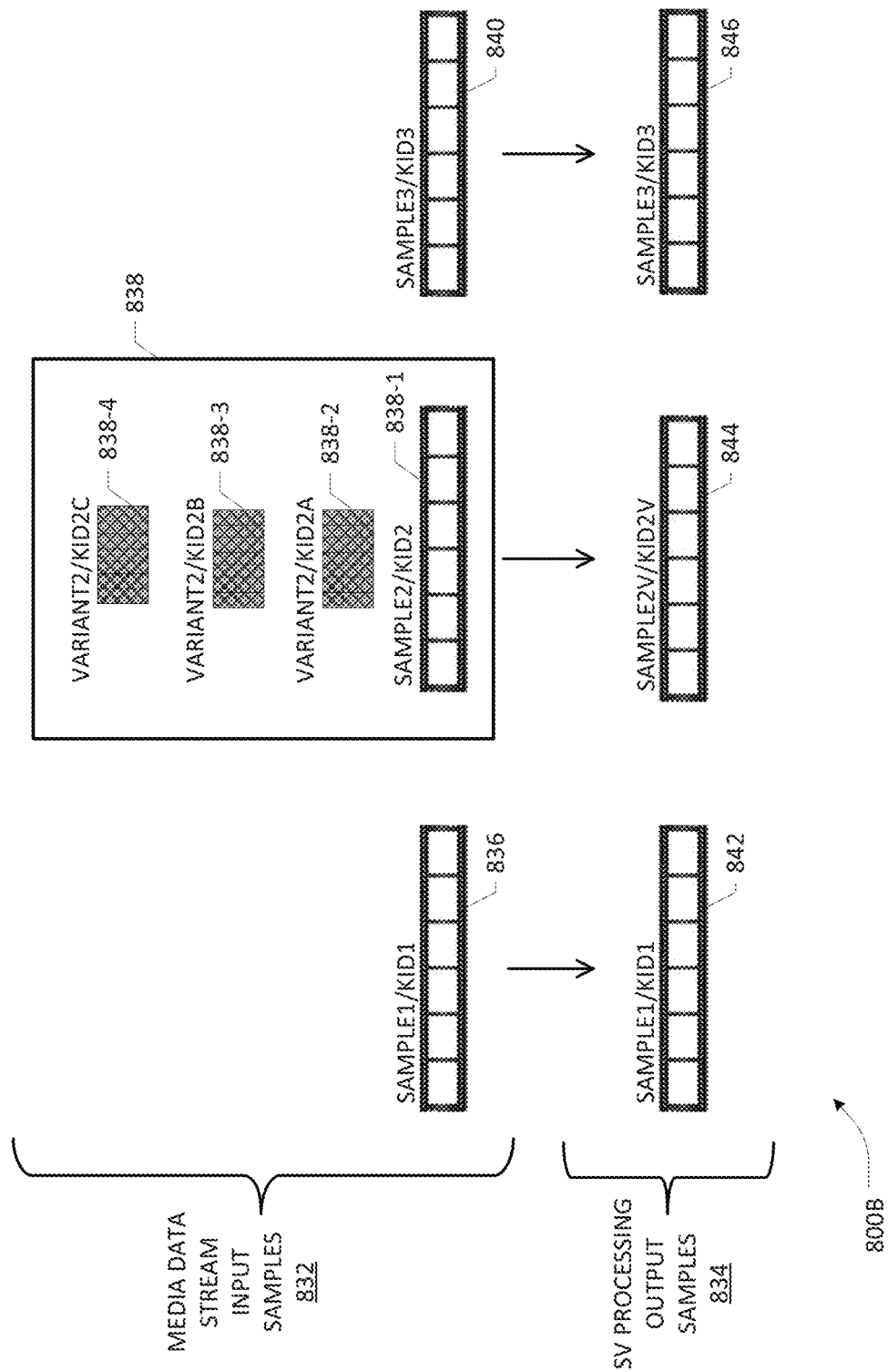

SYSTEM AND METHOD FOR WATERMARKING OF MEDIA SEGMENTS USING SAMPLE VARIANTS FOR NORMALIZED ENCRYPTION (SVNE)

CROSS-REFERENCE TO RELATED APPLICATIONS

This application is a 35 U.S.C. § 371 National Stage filing of PCT/IB2018/000210, filed Feb. 22, 2018, which claims the benefit of U.S. provisional patent application(s): (i) "SYSTEM AND METHOD FOR WATERMARKING OF MEDIA SEGMENTS USING SAMPLE VARIANTS FOR NORMALIZED ENCRYPTION (SVNE)," Application No.: 62/463,473, filed Feb. 24, 2017, in the name(s) of Prabhudev Navali, Raj Nair and Pablo Argon; each of which is hereby incorporated by reference in its entirety.

TECHNICAL FIELD

The present disclosure generally relates to communication networks. More particularly, and not by way of any limitation, the present disclosure is directed to a network architecture, system and method for distributing watermarked media using sample variant tracks over, for example, one or more managed networks, unmanaged networks, and/or any combination thereof.

BACKGROUND

Content providers have long struggled with how to provide content at a high availability and high performance to their customers in view of bandwidth limitations in content distribution networks. A content delivery/distribution network (CDN) can be a large distributed system of servers deployed in multiple data centers connected to the Internet or other public/private communications network. A CDN can be a managed or unmanaged network, and can also be a federation of managed or unmanaged networks. The goal of a CDN is to serve media content (e.g., video/audio/etc.) to user equipment (UE) nodes with high availability and high performance. The bandwidth requirements for distributing content from content providers to central CDN servers and/or to distributed edge replication servers have grown tremendously with the proliferation of adaptive streaming content delivery solutions.

Adaptive bitrate (ABR) streaming technology is being implemented to handle increasing consumer demands for streaming content (e.g., broadcast and on-demand movies/TV, etc.) across a content distribution network to UEs having widely differing performance and protocols, both in managed and unmanaged network environments. In the context of managed networks such as IPTV distribution over a service provider IP network, it should be appreciated that content delivery to the end user requires careful orchestration and management of various network infrastructure elements in order to address issues such as bandwidth, content protection, scalability and reachability, as well as adherence to requisite performance indicators, among others. Whereas advances in the media delivery technology continue apace, issues relating to high bandwidth and storage costs associated with the media delivery for multiple protocols, especially with multiple encryption techniques, digital rights management (DRM)/digital watermarking (DWM) schemes, etc., as well as achieving cost-effective convergence of delivery network infrastructures, etc., remain challenging. Additionally, such issues are further exacerbated as content producers and publishers are continually seeking more reliable ways to control access to their valuable media assets, while at the same time, broadening access via multiple communication paths and networks to expand revenue streams. Given the ever-growing threat of digital piracy, improvements in technologies relating to tracking individual digital assets, identification of content authorship and/or ownership, and ascertaining legal/legitimate means of media distribution, etc., are constantly being pursued.

SUMMARY

The present patent disclosure is broadly directed to systems, methods, apparatuses, as well as network nodes and associated non-transitory computer-readable media for facilitating the distribution and delivery of watermarked media content assets. In one example embodiment, a media preparation method is disclosed which comprises, inter alia, encoding a media source input into a plurality of adaptive bitrate (ABR) streams; for each bitrate stream, creating a main elementary stream or track having a first watermarking payload and at least one sample variant (SV) elementary stream having a second watermarking payload, wherein the first and second watermarking payloads are identified by respective watermarking identifiers (wmIDs); and providing the main elementary stream or track and at least one SV elementary stream or track to a packager. In one variation, the media preparation method may further include encrypting the main elementary stream or track and at least one SV elementary stream or track using different encryption schemes, such as, e.g., without limitation, standards-based 'cenc', 'cbcs' and 'cens' schemes. Other variations in encryption schemes are set forth further below. In an additional embodiment, the media preparation method may comprise generating a plurality of composite segments for each bitrate, wherein a composite segment include a main track and one or more sample variant tracks, each having a corresponding watermarking payload.

In another aspect, a distribution method involving watermarked media comprises, inter alia, transcoding a media content asset into a plurality of MEPG-TS elementary streams comprising a main elementary stream having a first watermarking payload and at least one SV elementary stream having a second watermarking payload, each first and second watermarking payloads identified with respective watermarking identifiers (wmIDs). A main track and sample variant tracks may be generated/formatted, e.g., ISO Base Media File Format (ISOBMFF) or Common Media Application Format (CMAF) tracks, from the TS elementary streams. A plurality of composite segments of the media content asset are generated in a suitable distribution container format, e.g., ISOBMFF, MPEG File Format (MP4), or CMAF, wherein each composite segment includes a segment or portion of the main track and a corresponding portion of the at least one variant track, which may comprise a plurality of sample variant (SV) tracks in accordance with the ISO/IEC 23001-12 [SMPLEVAR] specification, incorporated by reference herein. The main track and the at least one variant track may also be encrypted using respective encryption schemes, e.g., known standards based encryption schemes, which may be identified or signaled via suitable KID/key pair information independent of the watermarking payload identifiers. The composite segments may be uploaded to a network node, e.g., an origin server or an edge media router (EMR) node, associated with a content delivery network (CDN) that facilitates delivery of the watermarked segments to a client device based on specific watermarking signatures (e.g., wmIDs corresponding to a unique sequence of the segment variants authorized for the playback session). In one embodiment, watermarking signatures may be provided via a customized manifest from a client controller operating in conjunction with a watermarking session manager (WMSM) that facilitates delivery of watermarked segment variants to a client device. Additionally or alternatively, watermarking signatures may be provided via other mechanisms also, as will be forth below.

In another aspect, an embodiment of a network node or apparatus is disclosed that comprises, inter alia, one or more processors and a plurality of network interfaces configured to receive media content assets from one or more content sources. One or more persistent memory modules have program instructions thereon, which, when executed by the one or more processors, perform one or more methods set forth herein for preparing and distributing/uploading watermarked media content to an origin node.

In yet another aspect, an apparatus configured as an origin node or edge media router (EMR) node may comprise a plurality of interfaces for receiving watermarked media in composite segments for each bitrate of an ABR-encoded media content asset. For each bitrate, the media content asset may comprise a plurality of composite segments in a suitable format such as ISOBMFF, CMAF, MP4, etc. Each composite segment is configured to include a segment portion of a main track and a corresponding portion of at least one variant track, and wherein the main track contains a first watermarking payload and the at least one variant track contains a second watermarking payload, the watermarking payloads each identified or otherwise signaled by respective watermarking identifiers (wmIDs). One or more persistent memory modules are provided having program instructions stored thereon which, when executed by the one or more processors of the apparatus, perform the following acts: responsive to receiving a manifest request from a client device with respect to accessing a watermarked media content asset, generating a custom manifest including a watermarking signature specifying a unique sequence of watermarked segment variants of the media content asset; receiving a segment variant request from the client device to access the particular watermarked segment variant, wherein the segment request may include suitable parameterization based on KID/key information, URLs, watermarking payload identifier (wmID), segment name, etc.; and upon determining that the client device includes a variant extractor module, transmitting a composite segment corresponding to the particular watermarked segment variant to the client device authorized to be extracted for playback by a media player/application of the client device. The client device therefore receives the composite segments corresponding to the segment variants and utilizes the variant extractor to extract the appropriate segment variant from the composite segment. If the client device does not include a variant extractor module, the program instructions of the network node are configured to extract the particular watermarked segment variant from a combination of the main track and the at least one variant track of the composite segment based on associated watermarking IDs and transmitting the extracted particular watermarked segment variant to the client device for playback by a media player/application of the client device.

In another aspect, an embodiment of a method for distributing media content with watermarking is disclosed. The claimed embodiment involves, inter alia, generating a main track of a media content asset having a first encryption scheme and a first watermarking (WM) payload; generating at least one variant track of the media content asset having at least a second watermarking (WM) payload; generating a plurality of composite segments for the media content asset, each composite segment including a segment/portion of the main track and a corresponding portion (full or partial) of the at least one variant track, wherein the first watermarking payload and the second watermarking payload are each identified by a respective watermarking identifier (wmID); and uploading the plurality of composite segments to an origin server node coupled to a CDN. In an example implementation, the media content asset may comprise at least one of live TV content including one or more audio/video (A/V) elementary streams, IPTV content, time-shifted (TS) TV content, place-shifted (PS) TV content, gaming content, Video on Demand (VOD) content, adaptive multi-bitrate (MBR) content, Virtual Reality (VR) content, and networked digital video recorder (nDVR) content.

In another aspect, an embodiment of method of consuming watermarked media content is disclosed. The claimed embodiment comprises, inter alia, generating, at a client device, a manifest request with respect to accessing a watermarked media content asset; and receiving a custom manifest including a unique sequence of watermarked segment variants for the session for the media content asset. Responsive to the custom manifest, a segment variant request having appropriate parameterization is generated to an origin server having a plurality of composite segments for the media content asset, each composite segment including a segment/portion of a main track and a corresponding portion (partial or full sample) of at least one variant track, wherein the main track contains a first watermarking payload and the at least one variant track contains at least a second watermarking payload, the first watermarking payload and the at least a second watermarking payload each identified by a respective watermarking identifier. Upon determining that the client device includes a variant extractor module, a composite segment is received from the origin server, the composite segment corresponding to the particular watermarked segment variant authorized to be consumed. The variant extractor module executing at the client device is operative to extract the particular watermarked segment variant from a combination of the main track and the at least one variant track based on associated watermarking IDs to which it has access. The extracted watermarked segment variant is decrypted and decoded for rendering by a player application of the client device. If the client device does not include a variant extractor module, the client device receives the particular watermarked segment variant extracted by the origin server having a variant extractor module, based on a combination of the main track and the at least one variant track based on associated watermarking IDs provided in the custom manifest and/or the parameterized segment variant request. Thereafter, the extracted particular watermarked segment variant received from the origin server is decrypted and decoded for rendering by the player application of the client device. In one variation, the custom manifest may be protected by a manifest signature generated by a hash-based message authentication code (HMAC) using a Secure Hash Algorithm (SHA) scheme with a predetermined hash size.

In a further variation, the program instructions of an origin server node may comprise instructions for repackaging or transformatting the media content asset into an output format suitable for facilitating delivery to the client device in a compatible technology. Example delivery formats output by the origin server node in one implementation may include, but not limited to: HTTP Live Streaming (HLS), HTTP Dynamic Streaming (HDS), Dynamic Adaptive Streaming over HTTP (DASH), HTTP Smooth Streaming (HSS), Common Media File/Application Format (CMAF), ISO Base Media File Format (ISOBMFF) ISOBMFF, as well as HLS-TS, MPEG-TS, Real-time Transport Protocol (RTP)-encapsulated MPEG-TS, RTP/MPEG-TS over ISOBMFF, and RTP/MPEG-TS with Encoder Boundary Point (EBP) or virtual segmentation information.

In contrast to the existing watermarking workflows, embodiments of the present invention provide watermarking variant tracks wherein a subset of samples of the main track may have the variant data, thereby resulting in significantly less storage requirements. Further, instead of requiring too many keys for playback, which necessitates complex key management and coordination, using watermarked sample variants according to the embodiments herein advantageously provides the ability to generate a large combination of segment variants with watermarking variant tracks based on fewer keys for all the samples. As set forth herein, each sample variant track that is carrying watermarking payload may have an associated wmID. This track may also have an associated encryption scheme (e.g., cenc/cbcs/cens). Different sample variant tracks may have different encryption KID/key pairs. Accordingly, a simpler key management framework may be provided in combination with content publishers and multiple DRM entities. At the same time, because the segment variants can accommodate any number of multiple encryption schemes, which are typically deployed for achieving wider device coverage, embodiments set forth herein provide a highly scalable framework for facilittating distribution of watermarked media in different streaming environments. Additional benefits and advantages of the embodiments will be apparent in view of the following description and accompanying Figures.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, element, virtual appliance, UE device, and the like, mutatis mutandis. Further features of the various embodiments are as claimed in the dependent claims.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 7B depicts a message flow diagram relative to variant extraction in an example embodiment of the present invention;

DETAILED DESCRIPTION

Figure 1:
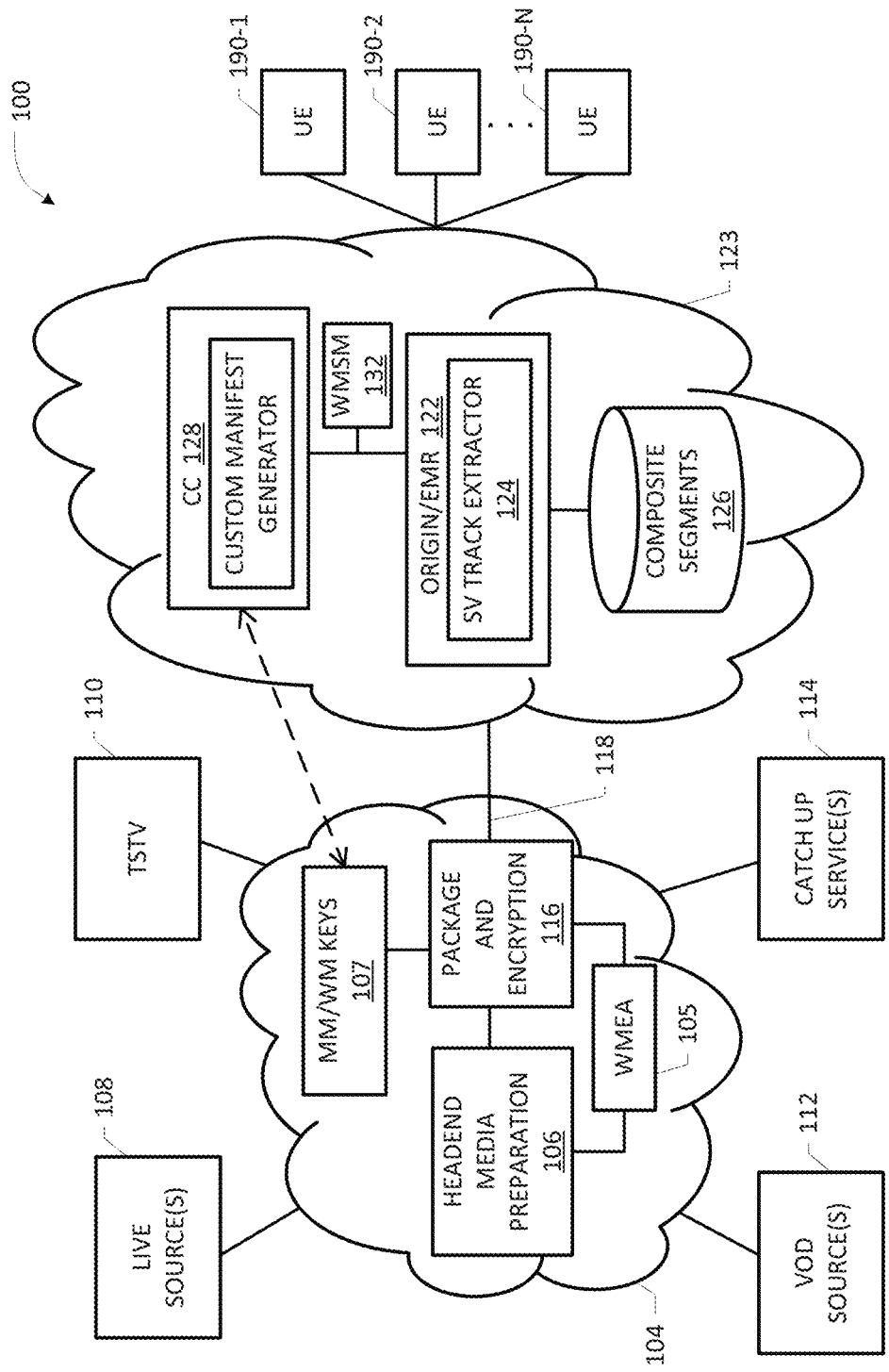
FIG. 1 depicts a generalized example network architecture for facilitating the distribution of watermarked media content assets according to one or more embodiments of the present patent application.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network element, node or subsystem may be comprised of one or more pieces of service network equipment, including hardware and software that communicatively interconnects other equipment on a network (e.g., other network elements, end stations, IP-STBs, STBs, etc.), and is adapted to host one or more applications or services, either in a virtualized or non-virtualized environment, with respect to a plurality of subscribers and associated user equipment that are operative to receive/consume content in a media streaming network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., A/V media delivery policy management, session control, QoS policy enforcement, bandwidth scheduling management, content provider priority policy management, streaming policy management, and the like), in addition to providing support for multiple application services (e.g., data and multimedia applications). Example subscriber end stations or client devices may comprise various streaming-capable devices that may consume or deliver media content assets using streaming and/or file-based downloading technologies, which may involve some type of rate adaptation in certain embodiments. Illustrative client devices or user equipment (UE) devices may therefore include any device configured to execute, inter alia, one or more streaming client applications for receiving, recording, storing, and/or rendering content, live media and/or static/on-demand media, from one or more content providers, e.g., via a broadband access network, in accordance with one or more file-based ABR streaming technologies such as, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on, as well as MPEG Transport Stream-based streaming over Real-time Transfer Protocol (RTP) networks. Accordingly, such client devices may include legacy set-top boxes (STBs), Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the WHO, Play Station 3®, etc.) and the like, which may access or consume content/services provided via an end-to-end encrypted media distribution network using multiple/alternate watermarking payloads in a suitable distribution container format according to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized example network architecture 100 for facilitating distribution and delivery of watermarked media content assets according to one or more embodiments of the present patent application. As will be seen in detail hereinbelow, an example embodiment may involve a suitable distribution container such as an ISO Base Media File Format (ISOBMFF)-based container, e.g., Common Media Application Format (CMAF), for providing watermarked content to one or more downstream/intermediary network nodes, although other formats for file-based or stream-based distribution may also be used in additional and/or alternative embodiments according to the teachings herein. In a still further variation, a common mezzanine distribution format or CMZF may be provided for distributing watermarked media contents, wherein a single intermediary distribution container structure, referred to herein as CMZF container structure, may be provided based on an MPEG Transport Stream (MPEG-TS) container format extended to include a modified Program-Specific Information (PSI) metadata structure configured to add extra elementary stream (ES) definitions corresponding to carriage of various stream types. Additional information relating to CMZF-based distribution may be found in the following commonly owned patent application(s): (i) "SYSTEM AND METHOD FOR MEDIA DELIVERY USING COMMON MEZZANINE DISTRIBUTION FORMAT", application Ser. No. 15/378,734, filed Dec. 14, 2016 (hereinafter referred to as the "CMZF patent application"), each of which is incorporated by reference herein.

In general, two different types of distribution methodologies may be provided for distributing watermarked media in the example network architecture 100. A file-based multicast ABR (MABR) methodology may involve IP/HTTP content distribution network infrastructure wherein packaged media segment files are distributed using multicast transmission. One skilled in the art will recognize that to error recovery may be performed at the segment-level with this distribution method, resulting in efficient scaling for "crowd-spiking", using multicast and unicast traffic, for example. A second distribution methodology involves stream-based multicast, where segments are also delivered using multicast but streamed at the level of RTP packets (e.g., RTP-over-MPEG-TS packets) where error recovery is at the packet level. It will be appreciated that this scheme is particularly suitable for multicast distribution using the extensive multicast MPEG-TS streaming network infrastructure currently deployed by service providers, thereby leveraging scalable and reliable workflows in a managed delivery environment. Since ABR media delivery including delivery of watermarked media requires a network architecture that can efficiently transport the media to an edge network where it can be delivered to the clients in a format best suited to the client and the network, embodiments of the present invention can be advantageously implemented wherein expected TV Key Performance Indicators (KPIs) such as ad insertion, fast channel change (FCC) or instance channel change (ICC), network DVR/PVR, etc., may be maintained while supporting ABR delivery needs as well as utilizing existing service provider TV infrastructure in some example implementations, whereby expected KPIs are maintained for both TV/STB and ABR clients.

In some arrangements, content may be distributed and/or delivered using either multicast techniques or unicast techniques. In a unicast mechanism, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations, as noted elsewhere in the present patent application), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast distribution/delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM), Internet Group Multicast Protocol (IGMP), RTP/MPEG-TS over UDP and IP multicast for stream-based multicast, NACK-Oriented Reliable Multicast or NORM, etc. When a receiver requests a given media item or asset, the network router system finds an existing stream of that content already in the network and directs a copy of it to that receiver from a serving cable headend, a video head office or an appropriately proximal network node in an edge distribution network. That is, multicast can be all the way from a headend packager (e.g., at a national data center) to home network node edge media router (EMR) and/or STB, which are further exemplified in additional drawing figures below. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts in a file-based mechanism. In some embodiments, UE devices (like STB, IP-STB, for example) that are consuming unicast or multicast streams may perform adaptive bitrate streaming. A given service can have multiple bitrate streams, and unicast or multicast consuming UE device (for example, an STB) may select a different bitrate based on the bandwidth estimation or user policy, etc.

It will be recognized that whereas "distribution" may be generally used to describe the provisioning of media within a core/distribution network and out to one or more edge servers, "delivery" of the media takes place between the edge server and the client, although such terms may be somewhat interchangeably used in the context of one or more embodiments of the present application. In general, the terms "media content," "digital asset", "content file", "media segments", or terms of similar import (or, simply "content") as used in reference to at least some embodiments of the present patent disclosure may include digital assets or program assets such as any type of audio/video (A/V) content that may comprise live capture media or static/stored on-demand media, e.g., over-the-air free network television (TV) shows or programs, pay TV broadcast programs via cable networks or satellite networks, free-to-air satellite TV shows, IPTV programs, Over-The-Top (OTT) and Video-On-Demand (VOD) or Movie-On-Demand (MOD) shows or programs, time-shifted TV (TSTV) content, Catch-up service content, Virtual Reality (VR) content, Augmented Reality (AR) content, ABR content, etc. By way of illustration, one or more live content sources 108, one or more TSTV content sources 110, one or more static/on-demand content sources 112 (e.g., VOD services and cloud/network DVR content sources), as well as Catch-up TV services 114 are shown in the network architecture 100 for serving as generalized content sources with respect to streaming media to a broad array of UE devices 190-1 to 190-N, at least some of which may be disposed in a subscriber premises and served by suitable premises equipment such as gateways, STBs, modems, etc. (not specifically shown). Media content assets from the content sources may be processed, encoded/ transcoded and/or prepared by suitable media preparation facilities 106 in conjunction with a packaging/encryption module 116 coupled to or otherwise associated with a national data center (NDC) for transmission over a core network 104 to an intermediary node 122 such, as, e.g., an origin node, that may be associated with an infrastructure combination 123 of an edge network and/or a content delivery network. In a further variation, the intermediary node 122 may comprise an edge media router (EMR) node as set forth in the CMZF patent application incorporated by reference hereinabove. Although not specifically shown in FIG. 1, it will be recognized that a network path 118 involving one or more unmanaged networks, one or more managed networks, and/or one or more federated networks, or any combination thereof may be deployed between the packaging facility 116 and downstream intermediary nodes 122. Further, as noted elsewhere in the present patent application, various types of edge networks and access networks may be interfaced between UEs/premises nodes and upstream network elements in the respective network infrastructures for facilitating media delivery over wired and/or wireless technologies, including without limitation, e.g., LTE/5G/Next Generation Network (NGN) technology, etc.

An example media server system associated with the network 104, e.g., at a global headend, may be configured to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc. In general operation, an example media preparation system 106 may be configured, under the control of one or more processors executing appropriate program code stored in a persistent memory module, to effectuate media preparation as follows. Initially, source media content is transcoded or otherwise encoded with different bit rates (e.g., multi-rate transcoding) using applicable encoder(s). For example, content of a particular media content asset or program may be transcoded into five video files using variable bit rates (or, synonymously "bitrates" or "resolutions"), ranging from low to high bit rates (500 Kbps to 10 Mbps, by way of illustration). The particular content is therefore encoded as five different "versions", wherein each bitrate is called a profile or representation. A segmentation server or segmenter is operative to divide each version of the encoded media content into fixed duration segments or chunks, which are typically between two and ten seconds in duration, thereby generating a plurality of chunk streams and/or virtual segmented streams depending on implementation. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned in an embodiment such that all encoding profiles have the same segments. In one embodiment, packaging 116 may be configured to containerize the media segments and/or adaptive TS streams (ATS) with virtual segmentation information to mark the segment boundaries (i.e., ATS virtual segmented media stream) into a composite segment format (e.g., suitable for file-based distribution, stream-based distribution, or both to the edge nodes), which media segments may include watermarked variants and associated signaling information, for transmission across entities disposed at different hierarchical levels of the network architecture 100, as will set forth in additional below.

In one example implementation, media content assets may be encrypted using one or more encryption schemes regardless of a particular watermarking payload. Example encryption schemes may comprise, for example, standards-based encryption schemes such as at least one of a Common Encryption (CENC and CENS-TS) protection scheme using Advanced Encryption Standard (AES) 128-bit keys in Counter mode (CTR), a CENC protection scheme using AES 128-bit keys in Cipher-block chaining mode (CBC), a CENC CTR mode using a subsample pattern of unencrypted bytes and encrypted bytes of the media content asset's audio/visual (A/V) data ('cens' scheme), a CENC CTR mode using a subsample pattern of unencrypted bytes and encrypted bytes of the media content asset's audio/visual (A/V) data ('cenc' scheme), a CENC CBC mode using another subsample pattern of unencrypted bytes and encrypted bytes of the media content asset's A/V data ('cbcs' scheme), a CENC-TS mode "cf" using a subsample pattern encryption scheme with AES 128-bit keys in CBC mode, a CENC-TS mode "cf" using a subsample pattern encryption scheme with AES-128 bit keys In CTR mode and a CENC-TS mode "cf" using a subsample encryption scheme (cenc) with AES-128 bit keys in CTR mode, and the like. In one arrangement, ISOBMFF-based carriage of multi-encrypted media may be facilitated by providing a main track in association with a plurality of variant tracks, wherein different tracks may be encrypted using different schemes, which may be referred to as "normalized encryption". As one skilled in the art will recognize, ISO/IEC 23001-12 [SMPLEVAR] specification, incorporated by reference herein, defines carriage of sample variants in the ISOBMFF format based on the following constructs: Sample Variant (which represents an assembled media sample replacing an original sample); Variant Byte Range (indicating the location of a sequence of bytes that might constitute a portion of a Sample Variant; Variant Constructor (Sample Variant metadata that defines how to assemble an individual Sample Variant); and Variant Media Data (which identifies media data used to construct a Sample Variant, some of which may come from the original sample media data).

In one example, one or more sample variant tracks may be used for signaling one or more encryption schemes, either full sample or partial sample (or, subsample), identified by a series of Key IDs (KIDs), in an arrangement referred to as Sample Variants for Normalized Encryption or SVNE. In one specific illustrative use case scenario, sample variants of the present invention may involve ISOBMFF tracks to carry sample data with one or more different encryption schemes, e.g., "cbcs" and "cens", which use subsample pattern based encryption of the video streams (i.e., 1 out of 10 blocks (pattern) of data is encrypted). In the SVNE embodiments herein, sample variants tracks may be configured to carry only encrypted part of sample data (e.g., 10% of sample data) with a different encryption scheme (for example "cens" subsample pattern based scheme) from the main/base track sample data (with "cbcs" subsample encryption scheme), or vice versa. In an example arrangement, there may be provided only one sample variant for every sample, and every sample in the main track has a sample variant, thereby allowing ISOBMFF to carry video sample data with two encryption schemes at the same time with just over 10% overhead. In other arrangements, the sample variant track can have a different pattern than the main track, if needed, for example like 20% or 30% data subsample data encrypted (2 of 10 blocks or 3 out of 10 blocks etc.). In one example SVNE use case, two tracks of a media content asset may be provided, with one main track that carries samples with one (i.e., first) encryption scheme and another sample variants track that carries samples in a different (i.e., second) encryption scheme. In an illustrative arrangement, for every sample in the main track, there may be provided an associated sample variant in the sample variant track, wherein the sample variants may have the same KID(s) as the main track samples. In another arrangement, the sample variants may be provided with KID(s) different than the main track's KID. Additional details relating to SVNE-based carriage of multi-encrypted media may be found in the following commonly owned patent application(s): (i) "MEDIA DISTRIBUTION WITH SAMPLE VARIANTS FOR NORMALIZED ENCRYPTION", application Ser. No. 15/379,009, filed Dec. 14, 2016 (hereinafter referred to as the "SVNE patent application"), each of which is incorporated by reference herein. In accordance with the teachings of the present patent application a media management (MM) module or node 107 operating in conjunction with suitable DRM agents (not specifically shown in this FIG.) may be provided for facilitating watermarking of a media content asset based on multiple tracks and/or multiple watermarking payloads. In one arrangement, constructs similar to the SVNE constructs described in the SVNE patent application may be provided, mutatis mutandis, wherein multiple identifiers (referred to herein as watermarking IDs or wmIDs) may be utilized in individualizing different watermarked payloads for various tracks, e.g., independent of any encryption schemes being utilized (signaled by a separate or the same set of KIDs, referred to as encryption KIDs (encKIDs) to provide distinction). A watermarking agent (WMEA) module 105 may be provided in association with a media transcoding functionality of the headend for facilitating generation of a plurality of elementary steams (ES) having different watermarking payloads for a media content asset, which may be segmented and packaged into composite segments in a suitable container format, with each composite segment having different variant tracks based on the keys provided by the MM module 107. Depending on the type of media asset, e.g., whether live or VOD, the main and variant watermarking elementary streams may be stored in a storage module prior to ingesting by the packager facility 116. As noted previously, packaged composite segments may be uploaded via network path 118 to origin/EMR node 122 disposed in the delivery network infrastructure 123. A watermarking session manager (WMSM) module 132 may also be disposed in association with the network infrastructure 123 that is operative with a client controller module 128 for generating suitable custom manifests based on the keys with respect to the delivery of requested media segments. In one arrangement, an extractor module 124 operating at the origin/EMR node 122 is adapted to extract/assemble a track to generate a deliverable media segment variant with appropriate watermarking payload and encryption scheme, DRM and delivery format. A database 126 may be associated with the origin/EMR node 122 for storing the segment variant data. In another arrangement, a client device or an application executing thereon (e.g., UE 190-1) may include the extractor functionality, in which case the entire composite segment may be provided to the requesting client device for extraction, decryption and decoding.

For purposes of an embodiment of the present invention, a digital watermarking payload may be provided as a marker signal that may be covertly embedded in the media data signal, e.g., audio, video, or image data signal, operating as a "carrier" signal. A watermarking agent may be executed as a "filter" comprising marker data and associated information that may be applied to the media stream. In some arrangements, watermarking may involve marker signals having hidden information that may contain a relation to the carrier media stream data, although it is not necessary that such a relationship exists. Various types of watermarking schemes or techniques may be utilized in an example embodiment based on, e.g., how a marker signal is applied, for generating watermarking payloads of media content assets. For example, a spread-spectrum watermarking method may involve obtaining a marked signal by an additive modification of the carrier signal. A quantization type watermarking method may involve quantization of the data. An amplitude modulation watermarking method may involve additive modification in the spatial domain of the carrier signal. Furthermore, some watermarking schemes may involve perceptible watermarks whereas other schemes may involve imperceptible watermarks.

Regardless of the watermarking schemes, techniques, methods, or versions used, sample variant (SV) tracks based on ISOBMFF may be provided for carrying watermarked media (i.e., watermarking payload) similar to the carriage of the multi-encrypted media as set forth in the SVNE patent application referenced hereinabove. As at least some example embodiments of the present invention particularly relate to ISOBMFF-based container format, a brief overview is set forth immediately below. ISOBMFF (ISO/IEC 14496-12, incorporated by reference herein) defines a general container or wrapper structure in a flexible, extensible format that facilitates interchange, management, editing and presentation of time-based multimedia files such as audio and video, which may form a basis for other container formats, wherein the presentation may be local, or via a network or other file-based delivery mechanism. In general, the media file format sets forth an object-oriented file structure and contains the timing, structure, and media information for timed sequences of media data, such as audio-visual presentations. A file can be decomposed into basic objects wherein the structure of the objects may be implied from their type. Files conforming to the ISOBMFF standard are formed as a series of objects, called "boxes" as noted elsewhere in the present patent application. All data is contained in boxes and there may be no other data within the file. The "box" is an object-oriented building block defined by a unique type identifier and length. A presentation (motion sequence) may be contained in several files. All timing and framing (position and size) information must be in the ISO base media file and the ancillary files may essentially use any format to the extent they are capable of description by the metadata defined in ISO base media file format. In order to identify the specifications to which a file based on ISOBMFF complies, brands are used as identifiers in the file format. They may be set in a box named File Type Box ("ftyp"), which must be placed in the beginning of the file. A file that supports streaming includes information about the data units to stream (e.g., how to serve the elementary stream data in the file over streaming protocols). This information is placed in additional tracks of the file called "hint" tracks. Separate "hint" tracks for different protocols may be included within the same file. Additional boxes relating to streaming include "moov" box, "mdat" box, "moof" box, etc., which may be utilized in example composite segment tracks described below.

An overview of sample variant (SV) processing is provided below with respect to example media input tracks and processed output tracks, which may be applied in an example watermarking scenario according to an embodiment of the present invention.

Figure 8A:
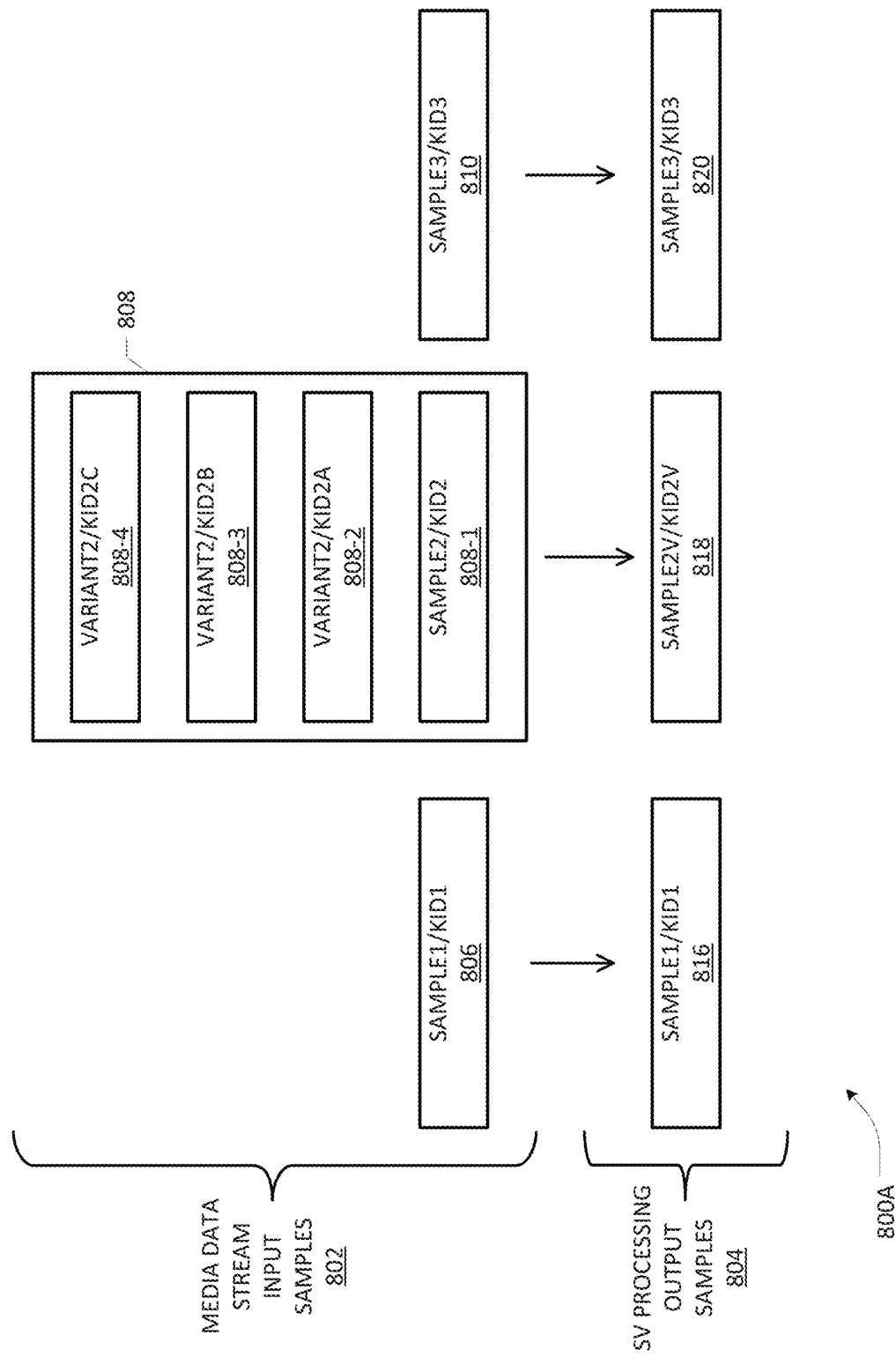
FIGS. 8A/8B and 9 depict example sample variant processing schemes that may be used and/or modified in an example embodiment for facilitating transmission of media with one or more encryption schemes and/or watermarking payloads according to an embodiment of the present invention.

Taking reference to FIG. 8A, an example SV processing scenario 800A illustrates an arrangement where a particular sample of an encoded media content asset has a plurality of sample variants that require processing by a receiver for proper output. In this arrangement, three samples are shown in a series from left to right, i.e., samples 806, 808, 810, in a top row 802 that conceptually represents a media data stream obtained from an encoding process using, e.g., using ISOBMFF or MPEG-2 TS, which may be input to a downstream SV processing functionality. Whereas the first and third samples 806, 810 are shown as each having only one respective data stream portion, the middle sample 808 is shown having a base sample 808-1 as well as three variants 808-2 to 808-4. Each of the three samples are identified by a KID parameter respectively associated therewith, KID1 to KID3, with the second sample's variants having their own respective KIDs, KID2a-KID2c, while the base sample 808-1 has a KID2. Output 804 obtained from the SV processor contain the same first and third samples 804, 810 as output first and third samples 816, 820 respectively, whereas only one of the variants of the middle input sample 808 is output as sample 818. Access to samples and their variants may be provided under the control of KIDs as depicted in the input row 802 of the arrangement shown in FIG. 8A. In one implementation, a hierarchy of KIDs may be used for sample variants, which may be used to provide access to data, with the higher level KIDs providing access to sample variant Metadata and the lower level KIDs providing access to media data.

FIG. 8B depicts another scenario 800B in which a sample (middle sample 838) of an input stream 832 has a number of sample variants (e.g., three variants 838-2 to 838-4) along with a base sample 838-1, whereas first and third input samples 836, 840 each have a single respective data stream portion as in the previous scenario of FIG. 8A. In this case, however, only the data that differs from the original sample is carried in the samples of the variant data stream. Accordingly, whereas base sample 838-1 is a full sample, sample variants 832-2 to 832-4 are subsamples or partial samples that differ from the full sample data of the base sample 838-1. As in the scenario 800A of FIG. 8A, input stream 832 may be representative of a stream encoded according to ISOBMFF or MPEG-2 TS whereas an output stream 834 is representative of samples obtained after processing by a downstream SV processor (e.g., provided at an EMR node and/or a client UE device), with access to samples controlled via KIDs as depicted in the top row. Based on KIDs, output samples comprise a first output sample 842, a second output sample 844 assembled or generated from the second input sample 838-1 and its variants 838-2 to 838-4, and a third output sample 846. Under some use cases of the present invention, such as subsample pattern encryption of samples with watermarking payload, the amount of redundant data between an original sample and a corresponding sample variant may be relatively large, which may not have to transmitted and stored, thereby generating substantial savings in network resources such as bandwidth consumption as well as reduced storage costs. In one arrangement, sample variants can reference byte ranges of the original media data stream in addition to those of the current variant data stream, as well as additional variant data streams. Skilled artisans will recognize that such an arrangement involving subsampling or partial sampling can enable more efficient carriage of sample variants than if sample variants are to be encoded in their entirety (i.e., full samples).

Figure 9:
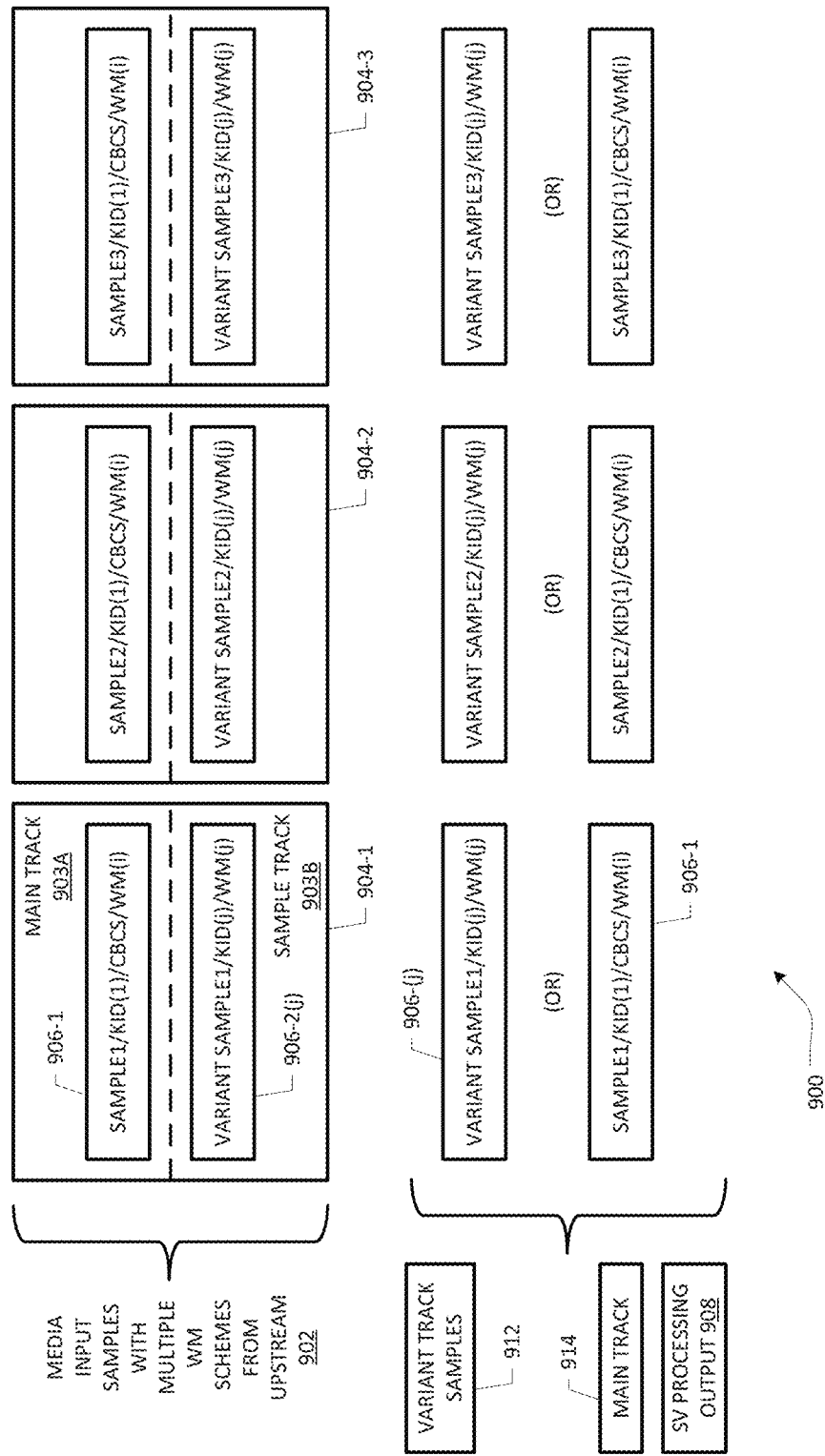

FIG. 9 illustrates a scenario 900 where a media data stream prepared for one watermarking payload may be adapted using sample variants to support multiple other watermarking payloads on a sample by sample basis, regardless of multiple encryption schemes. In other words, same watermarking payload may be encrypted with different encryption schemes in different sample variant tracks. For the sake of simplicity, a single encryption scheme, e.g., CBCS, is illustrated with respect to an input stream 902 although multiple encryption schemes may also be provided along with multiple watermarking payloads. Similar to the scenarios above, three input samples 904-1, 904-2, 904-3 are illustrated, from left to right, each containing a main or base sample track 903A in addition to a plurality of sample variant tracks 903B. By way of illustration, sample 904-1 illustrates a base sample 906-1 having a watermarking payload WM(i) as well as a plurality of sample variants 906-2($j$) having respective watermarking payloads WM($j$), wherein the base sample and associated variants each have a respective encryption KID, which may be different or the same depending on a particular implementation. SV processing output 908 comprises one of an output main track 914 or an assembled sample variant track 912, comprising respective watermarking payloads depending on watermarking IDs. Where different encryption schemes are employed, it is possible to provide input SV tracks such as e.g., SV 1 track—WM A payload with CBCS and SV 2 track—WM A payload with CENS, and so on for different WM payload and encryption combinations, with the SV processing configured to generate appropriate output accordingly.

A watermarking control framework may be provided in an example implementation wherein a content publisher or other suitable entity may be configured to encode encrypted, compressed variant media data into a format (e.g., the ISOBMFF file or MPEG-2 TS) having one or more watermarking payloads and ensure that each set of variant media data for a given sample time is watermarked and encrypted with a key, and signaled with respective KIDs and protection schemes. The content publisher or provider node may interface with a DRM system to manage the release of KIDs/keys and protection scheme information such that the playback path (the actual sample data used during playback) is controlled and the player can only decrypt and render a particular watermarked copy of the data that it has been authorized to render.

In one embodiment, SV processing may take place in association with a decoder, e.g., at a client UE device, in a variant decoder model. Additional details relating to SV processing, e.g., variant constructors and associated syntax and semantics, etc., in the context of decoder processing may be found in the SVNE patent application incorporated by reference hereinabove. As an alternative to the SV processing by the decoder, an extractor may be used to pre-process the sample variants to generate a new media data stream and associated metadata for ISOBMFF or MPEG-2TS. Accordingly, in an alternative or additional arrangement, an extractor process may be executed as part of SV processing to extract a complete ISOBMFF media track having an authorized watermarked copy from a file/segment that has both main and sample variant tracks. The extractor functionality may be provided at a client UE device/player and/or at a network node, e.g., origin server, EMR node, CDN delivery node, etc., depending on implementation, which will be set forth in additional detail further below. Skilled artisans will recognize that variant processing similar to the processes set forth in the SVNE patent application may also be applied in the context of a variant extractor-based implementation.

Turning now to FIGS. 2A-2D, depicted therein are flowcharts of various steps, blocks and/or acts that may be combined or arranged into one or more embodiments, with or without blocks from other flowcharts, for facilitating the preparation and distribution of watermarked content in the example network architecture of FIG. 1. Broadly, an embodiment of a media preparation process is set forth at reference numeral 200D in FIG. 2D, which may involve the following. A media source input may be encoded into a plurality of ABR streams (block 252). For each bitrate stream, one or more encoder/transcoder nodes may be configured to create a main elementary stream (e.g., MPEG-TS) or track (e.g., ISOBMFF) and one or more watermarking elementary streams (for MPEG-TS) or tracks (for ISOBMFF), e.g., in sample variants (block 254). Accordingly, for a given media content asset, an encoder/transcoder may create multiple bitrate streams, each bitrate stream having corresponding main elementary stream and one or more SV watermarking elementary streams. In one arrangement, the main elementary stream or track and at least one SV elementary stream or track may be encrypted using one or more different or same encryption schemes (block 256). These streams are then passed to a segmenter/package node for generating CMAF composite segments having multiple tracks each carrying a different watermarking payload. As there may be multiple bitrates in an ABR scheme, there will be a composite segment stream for each bitrate (blocks 258, 260). In a specific example implementation set forth at reference numeral 200A of FIG. 2A, an encoder/transcoder functionality is operative to encode/transcode a media content asset into a plurality of elementary streams, e.g., MPEG-TS elementary streams, for each of the bitrates of MBR-encoded media content asset, with a main elementary stream having a first watermarking payload identified by an identifier provided in association with a WM agent (block 201). Further, at least a sample variant elementary stream having a second watermarking payload and associated identifier is also generated. At block 202, a main track (e.g., ISOBMFF track) of a media content asset is generated, formatted or otherwise created from or based on the main elementary stream having the first watermarking payload, e.g., according to a specific watermarking scheme. The main track may also be encrypted using a first encryption scheme. At block 204, at least one variant track of the media content asset is generated (e.g., ISOBMFF sample variant track), formatted or otherwise created from or based on the SV elementary streams having the second watermarking payload according to the watermarking scheme. At block 206, a plurality of composite segments for the media content asset are created in a particular format, e.g., CMAF, by way of segmentation and packaging, wherein each composite segment includes a segment portion of the main track and a corresponding portion of the at least one variant track. As noted above, the first watermarking payload and the at least a second watermarking payload may each be identified or otherwise signaled by a respective watermarking identifier or indicium, (wmID), e.g., a numerical indicium such as, WM-1, WM-2, WM-n, or an alphabetical indicium such as WM-A, WM-B, WM-Z, and the like or any combination thereof. At block 210, the plurality of composite segments may be uploaded to an origin server node or EMR node associated with a CDN for storage and transmission/delivery. Optionally, a further variation may involve providing double protection of the composite segments with a service key for added protection (block 208), wherein the data of a sample variant byte range is first encrypted with a media key (i.e., encryption key associated with the media sample) and then with a second variant byte (vbr) range key. As will be seen below, additional/alternative schemes for providing double encryption may be implemented in some embodiments. A similar composite segment generation process may also be provided for all bitrates using ISOBMFF output from the encoder in another arrangement.

Figure 2A:
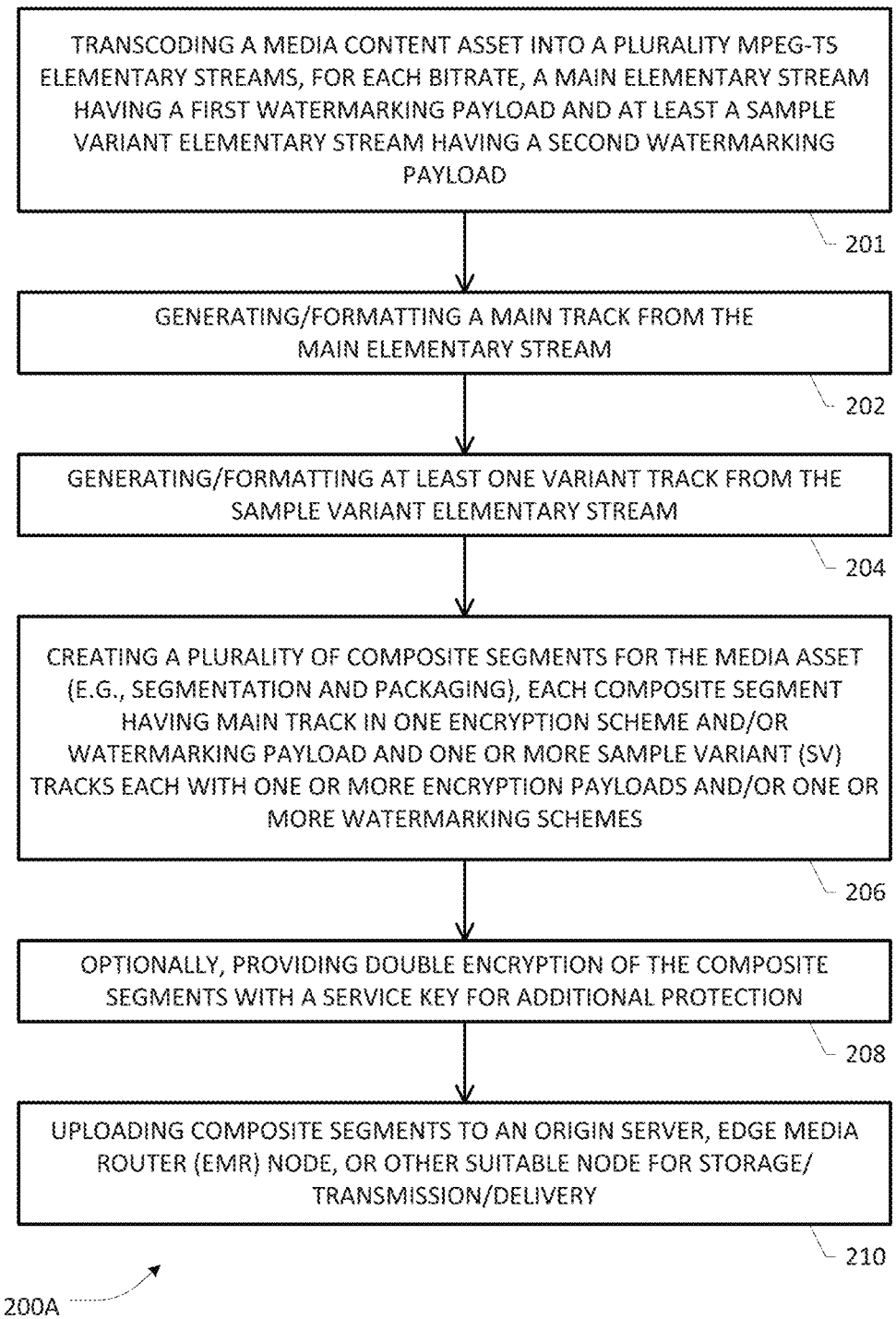
FIGS. 2A-2D are flowcharts of various steps, blocks or acts that may be combined or arranged into one or more embodiments, with or without blocks from other flowcharts, for facilitating distribution of content with watermarking in an example streaming network according to the teachings of the present patent application.
Figure 2B:
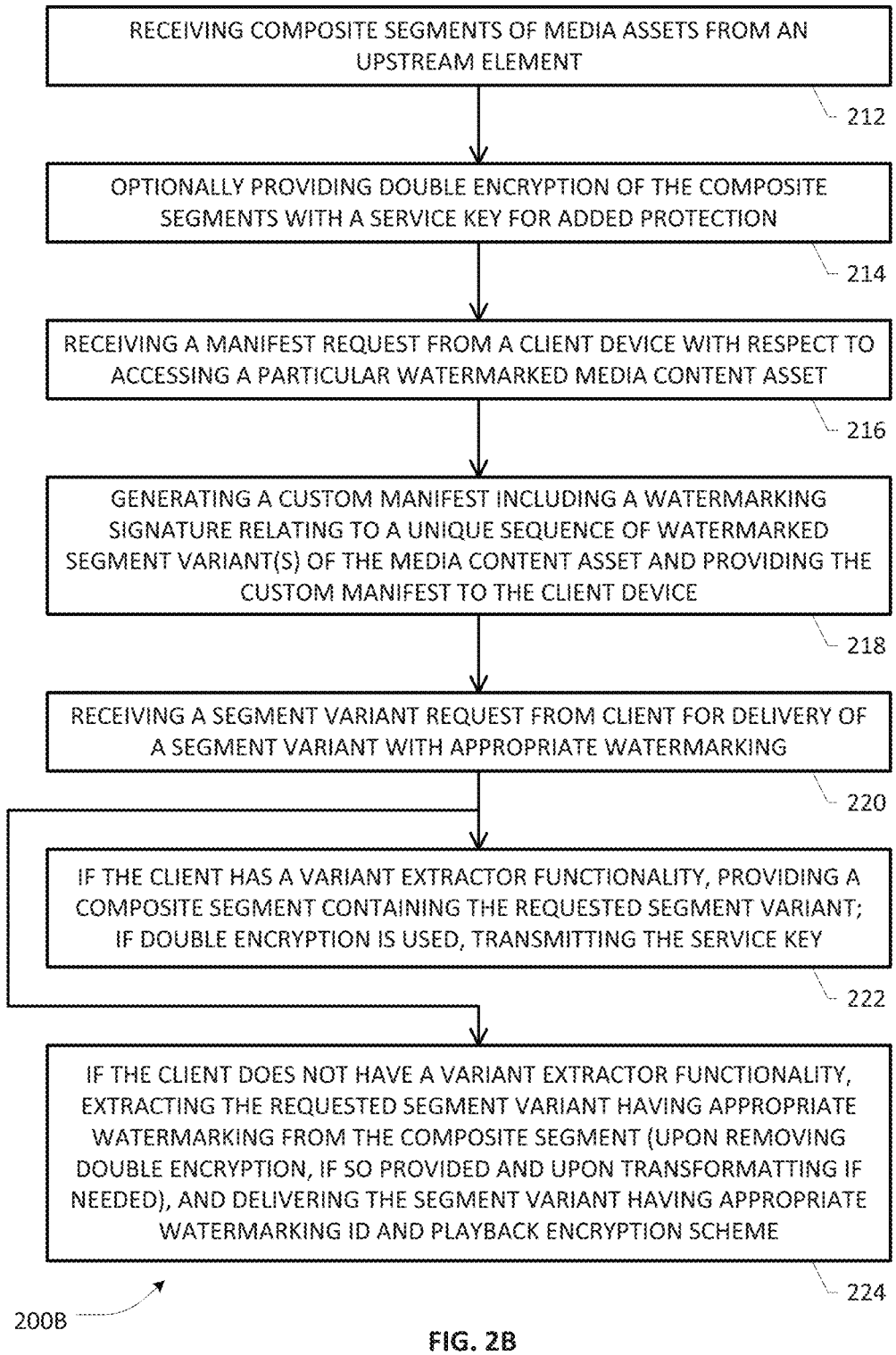

FIG. 2B depicts a process 200B that may be executed at an intermediary infrastructure facility involving, e.g., an origin server, client controller, WM session manager, EMR or delivery node associated with a CDN. At block 212, composite segments of media content assets are received from one or more upstream nodes, e.g., headend packager nodes associated with content providers, which reception may be asynchronous and/or unrelated to whether there are any media requests from a client device. As noted previously, each composite segment of a media content asset includes a segment portion of a main track and a corresponding portion of at least one variant track. Where the composite segments are not double-encrypted by the headend node, process 200B may optionally include a double encryption process using a suitable service key (block 214). Upon receiving a manifest request (block 216) from a client device with respect to accessing a watermarked media content asset, a custom manifest is generated including a unique sequence of WM IDs relating to the particular watermarked segment variants of the media content asset, which custom manifest is provided to the client device (block 218). A segment variant request is received from the client device to access a particular watermarked segment variant, which includes the WM identifier data, media location data, etc. (block 220). Upon determining that the client device includes a variant extractor module, a composite segment corresponding to the particular watermarked segment variant is transmitted to the client device authorized to be extracted for playback by the client device (block 222). Where a double encryption process is optionally used, the service key associated with double encryption is provided to the client device. If the client device does not include a variant extractor module, process 200B involves extracting and assembling the particular watermarked segment variant from a combination of the main track and the at least one variant track of the composite segment based on associated watermarking IDs (wmIDs) and transmitting the extracted particular watermarked segment variant in a suitable delivery container format to the client device for playback by a media player executing thereat (block 224). If any double encryption was used, the segment variant will be decrypted accordingly before sending to the client device. Furthermore, where delivery container transformatting is needed, suitable transformatting may also be performed to obtain a delivery container that is compatible with the client device.

Figure 2C:
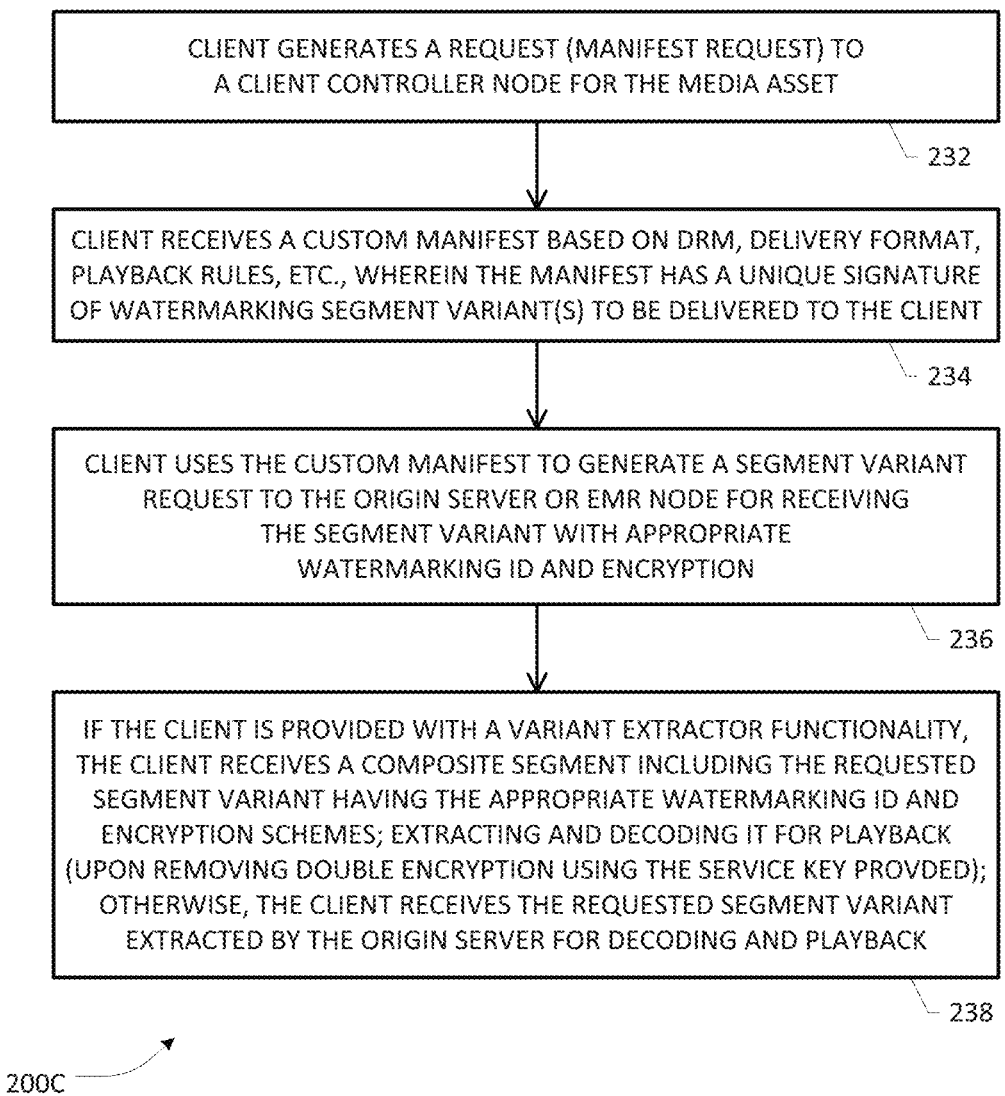
Figure 2D:
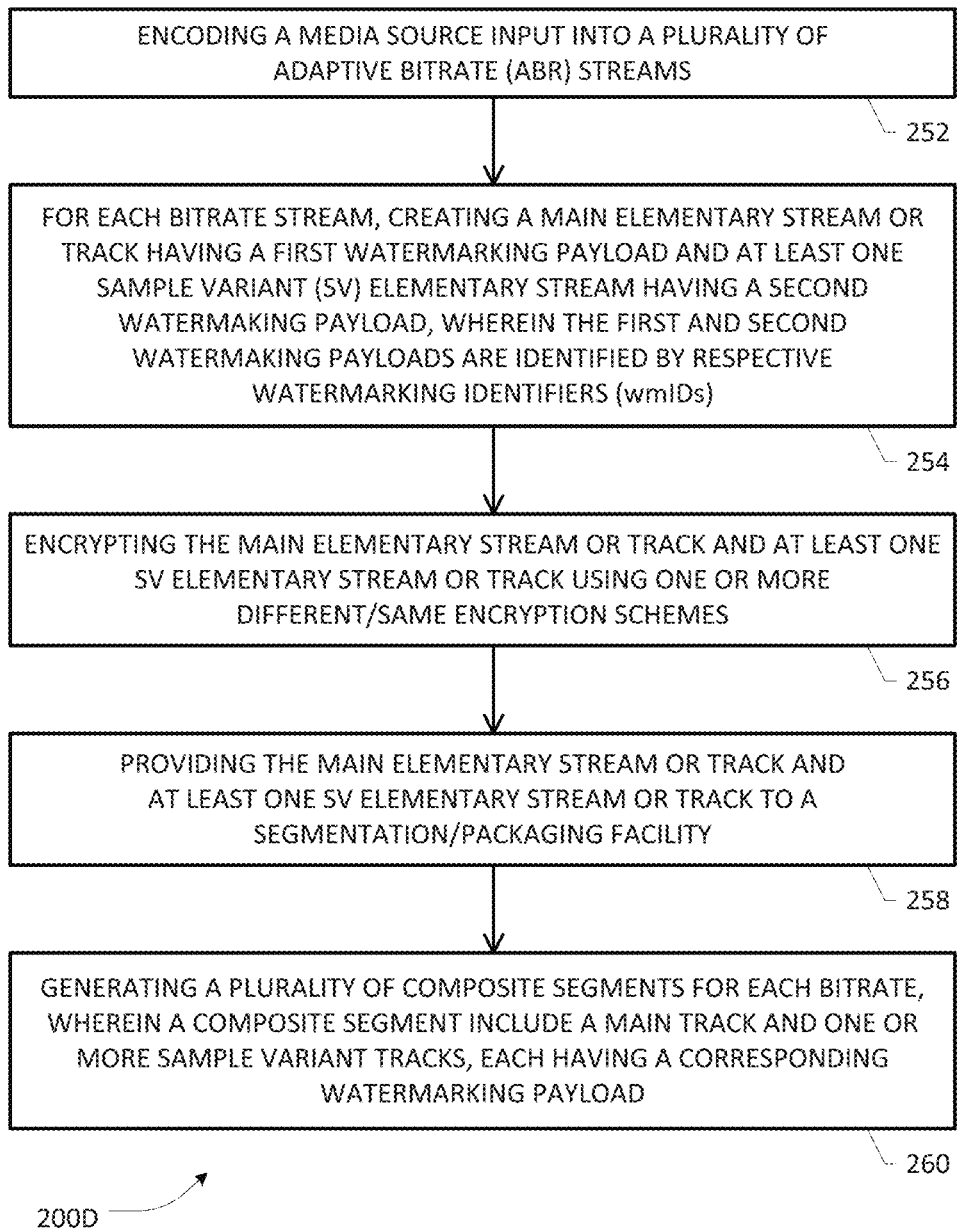

Process 200C depicted in FIG. 2C is illustrative of a media consumption method executing at a client device with respect to watermarked media. At block 232, the client device (or a suitable media application executing thereon) generates a manifest request (i.e., a first request) with respect to accessing a watermarked media content asset. Responsive thereto, a custom manifest is received from a client controller node, which includes a unique sequence of WM identifiers (i.e., a watermarking signature) relating to a particular sequence of watermarked segment variants of the media content asset (block 234). In one arrangement, the custom manifest may therefore be based on based on DRM, delivery format, playback rules (PBRs), etc., wherein the manifest has a unique signature of watermarking segment variants to be delivered to the client. Responsive to the custom manifest, the client/application generates a segment request to an origin server (i.e., a second request) for a segment variant with appropriate watermarking ID and encryption scheme (block 236). In still other arrangements, watermarking signatures may be delivered, obtained or provided using out-of-band transmission, via initialization segments, and/or other types of manifests, etc. In still further arrangements, a session authentication data may be provided in addition to the watermarking signature of the unique sequence of the segment variants. As noted above, the origin server maintains a storage of media content assets in the form of a plurality of composite segments for each media content asset, with each composite segment including a segment portion of a main track and a corresponding portion of at least one variant track, wherein the main track contains a first watermarking payload and the at least one variant track contains at least a second watermarking payload, the first watermarking payload and the at least a second watermarking payload each identified by a respective watermarking identifier (wmID). If the client device includes a variant extractor module, it receives a composite segment from the origin server, the composite segment corresponding to the particular watermarked segment variant authorized to be consumed. Optionally, a service key associated with double encryption may also be received if a double encryption scheme is employed for providing additional protection of media data. As set forth at block 238, the client variant extractor module extracts the particular watermarked segment variant from a combination of the main track and the at least one variant track based on associated wmIDs to which the client device has access. The client device/application thereafter proceeds to decrypt and decode the extracted particular watermarked segment variant for rendering by a player application of the client device. If the client device does not include a variant extractor module, it receives the particular watermarked segment variant extracted and assembled by the origin server from a combination of the main track and the at least one variant track based on associated wmIDs in association with the WM session manager (block 238). The client device/application thereafter proceeds to decrypt and decode the received particular watermarked segment variant from the origin server for rendering by the player application of the client device.

Figure 4:
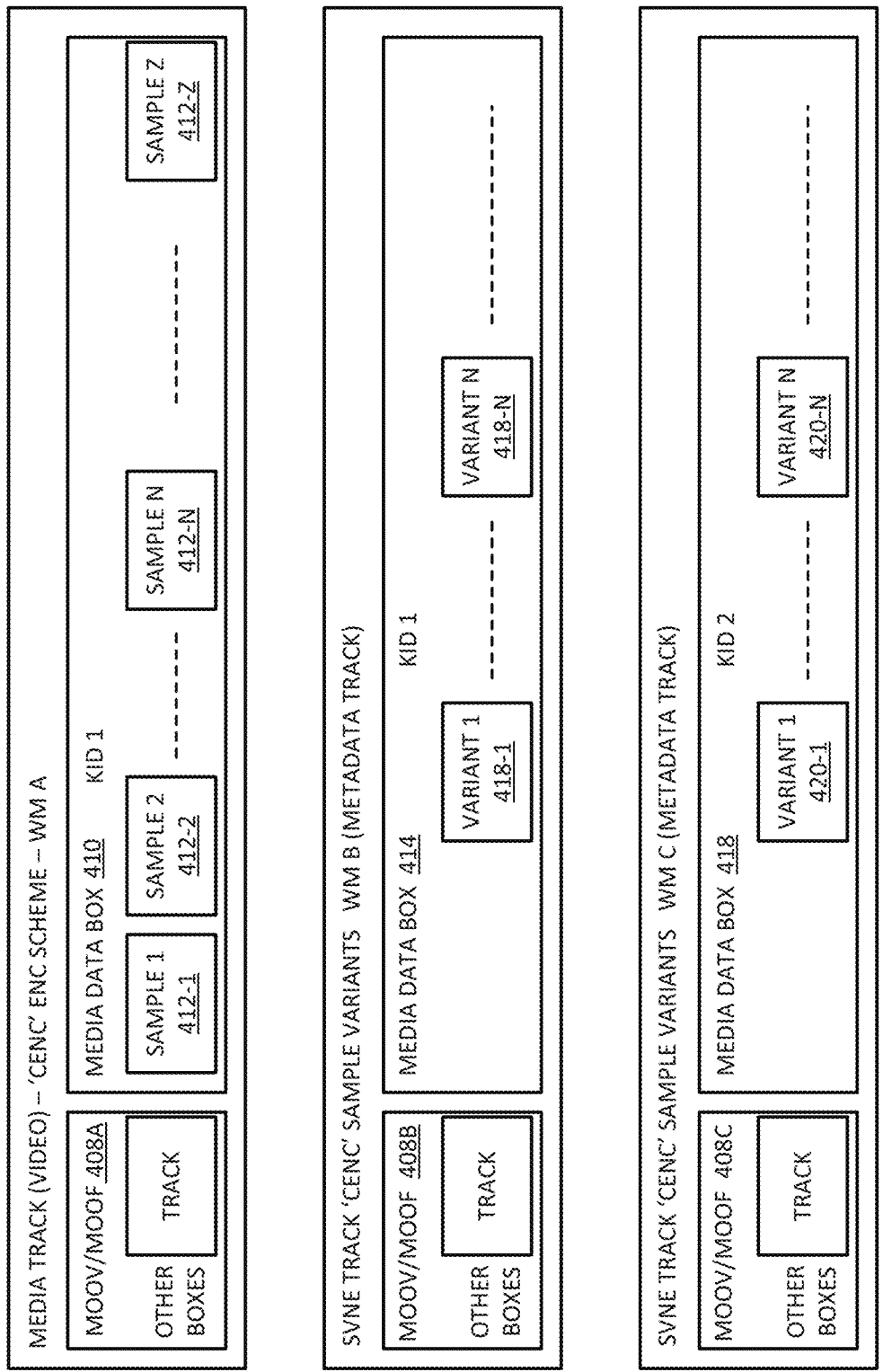
FIGS. 4-6 depict example composite segments containing a main track and one or more sample variant tracks, each having a watermarking payload of a media content asset in accordance with one or more embodiments of the invention.
Figure 5:
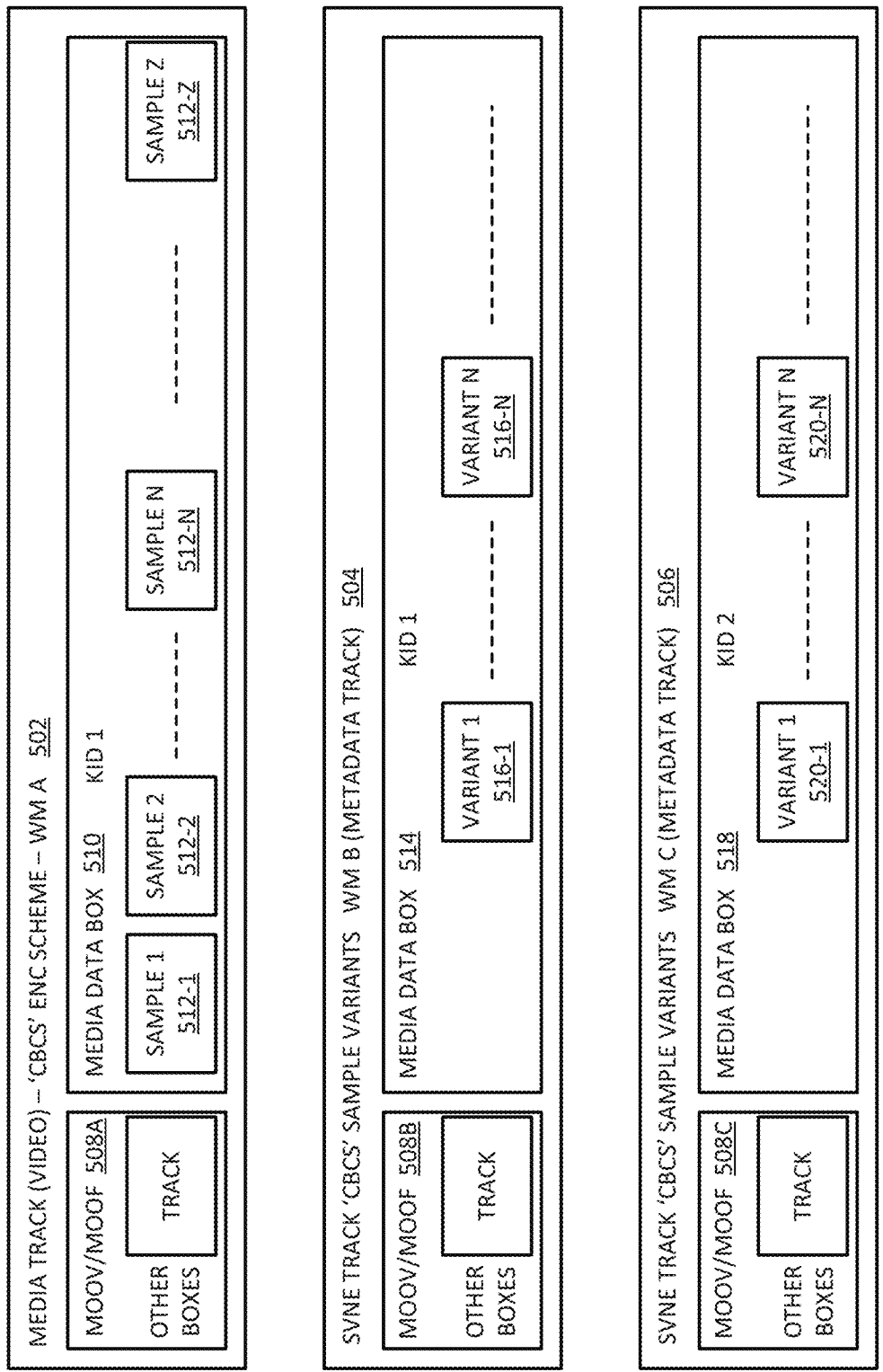
Figure 6:
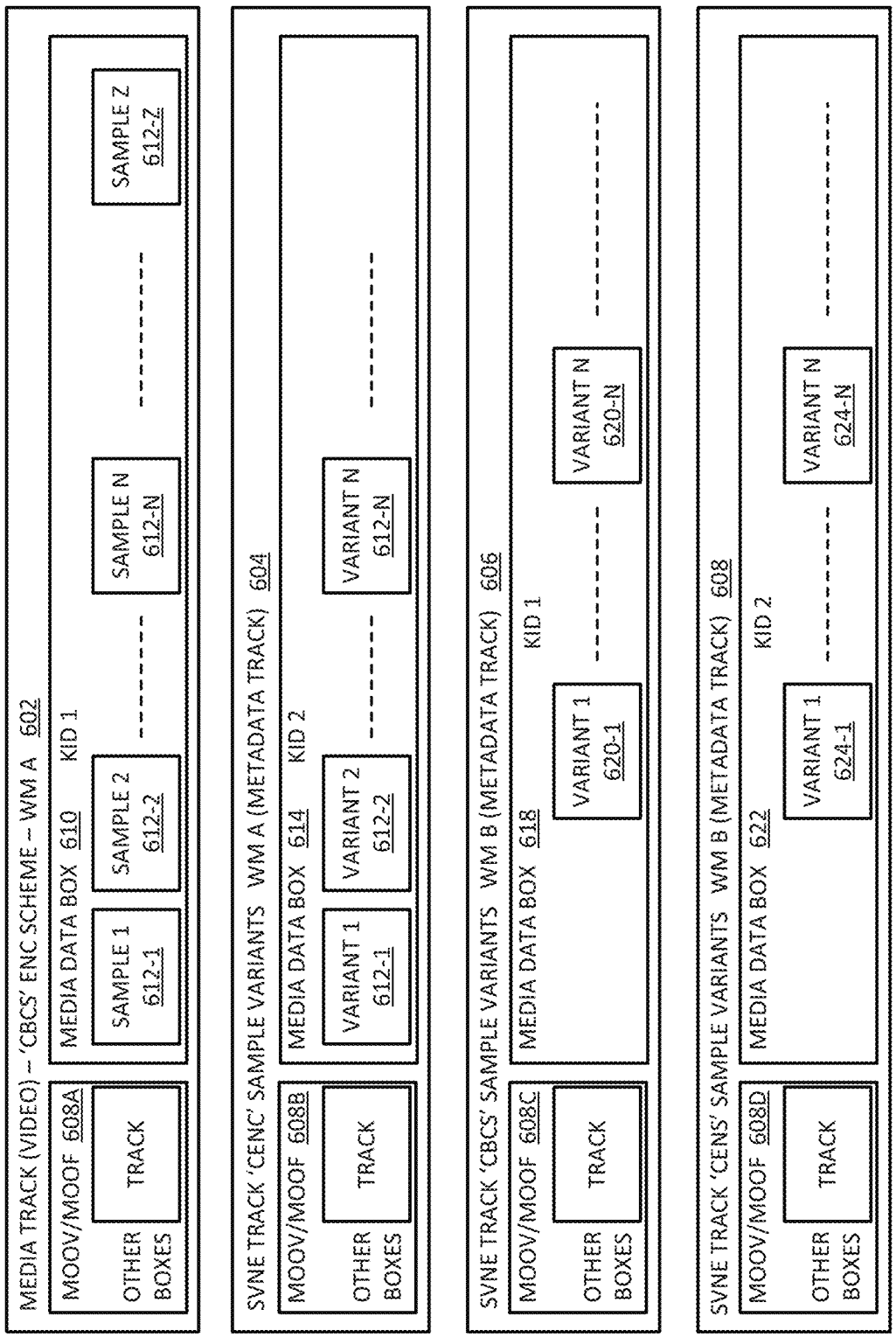

FIGS. 4-6 depict example composite segments containing a main track and one or more sample variant tracks, each having a watermarking payload in accordance with one or more embodiments of the invention, which may be generated by a headend facility associated with a content publisher and suitable DRM entities. As noted previously, sample variant data may be stored in one or more ISOBMFF metadata tracks (variant tracks) with which an ISOBMFF video media track (media track) may be associated. Example segment track scheme 400 of FIG. 4 illustrates a main media track 402 having a 'cenc' encryption scheme and a first watermarking payload identified as "A" (WM A), along with two associated sample variant tracks 404, 406, each having the same 'cenc' encryption scheme but different watermarking payloads having corresponding identifiers, WM B and WM C, respectively, than the main track 402. As per the ISOBMFF standard, each track may be provided with appropriate MOOV/MOOF, Track and other boxes, illustrated respectively at 408A, 408B, 408C. When an association is established between a media track and a variant track, sample variant processing may be executed whenever a decoder/extractor does not have access to the KID/key defined for a sample in the media track. In one implementation, a given sample variant track is always associated with a corresponding video media track, though the converse need not always true. Further, samples within associated tracks are considered associated if they are time-parallel. A plurality of samples 412-1 to 412-z having WM A payload are illustrated as part of the Media Data Box 410 of the media track 402, wherein KID1 is provided for identifying or otherwise signaling the encryption scheme. Sample variant track 404 includes a Media Data Box 414 illustrated with sample variants 418-1 to 416-n, which have WM B payload, that is also signaled using KID1 for the encryption scheme. On the other hand, sample variant track 406 includes a Media Data Box 418 illustrated with sample variants 420-1 to 420-n, which have WM C payload, that is signaled using a different KID, i.e., KID2, for the encryption scheme being used.

Example segment track scheme 500 of FIG. 5 illustrates a main media track 502 having a 'cbcs' encryption scheme and a first watermarking payload (identified as WM A), along with two associated sample variant tracks 504, 506, each having the same 'cbcs' encryption scheme but different watermarking payloads, identified by WM B and WM C, respectively, similar to the segment track scheme 400 set forth above. Skilled artisans will recognize that the 'cbcs' based segment track scheme 500 is essentially identical to the 'cenc' based segment track scheme 400. Accordingly, a similar description with respect to main track Media Data Box 510 (containing samples 512-1 to 512-z), sample variant track Media Data Boxes 514, 518, as well as main track samples 512-1 to 512-z and sample metadata track variants 516-1 to 516-n and 520-1 to 520-n, along with suitable MOOV/MOOF boxes 508A-508C may also be applied here as well.

Example segment track scheme 600 of FIG. 6 is illustrative of multiple encryption schemes and multiple watermarking payloads provided in an exemplary composite CMAF segment. By way of further illustration, two encryption schemes, 'cens' and 'cbcs' schemes, and two watermarking payloads, WM A (wmID) and WM B (wmID), are provided. It can be seen that four possible tracks/streams may be obtained, where one track is the full sample main track 602 having, for example, the 'cbcs' encryption scheme and WM A watermarking payload, with the remaining three tracks comprising sample variant metadata tracks having the rest of the encryption/WM payload combinations. Associated first sample variant track 604 is provided with the 'cens' encryption scheme and WM A watermarking payload, associated second sample variant track 606 is provided with the 'cbcs' encryption scheme and WM B watermarking payload, and associated third sample variant track 608 is provided with the 'cens' encryption scheme and WM B watermarking payload. Similar to the example single-encryption segment track scenarios above, each separate track may be provided with associated MOOV/MOOF and other ISOBMFF boxes 608A-608D and respective Media Data Boxes 610, 614, 618, 622, that each respectively comprise samples 612-1 to 612-z and variants 616-1 to 616-n; 620-1 to 620-n; and 624-1 to 624-n.

Figure 3A:
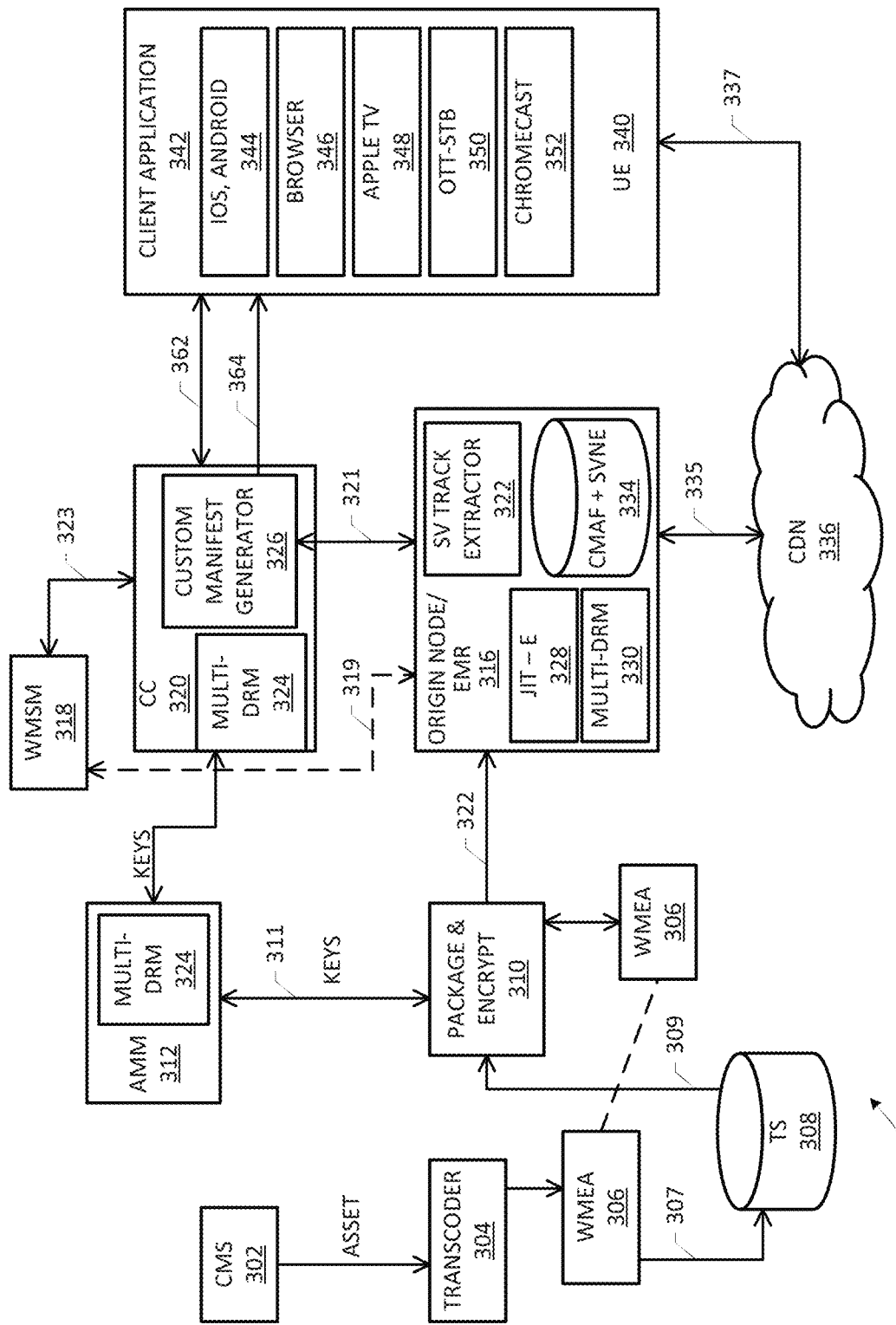
FIGS. 3A and 3B depict more particularized example of network architectures for distributing watermarked Video-On-Demand (VOD) and live media content, respectively, in accordance with one or more embodiments of the invention.
Figure 3B:
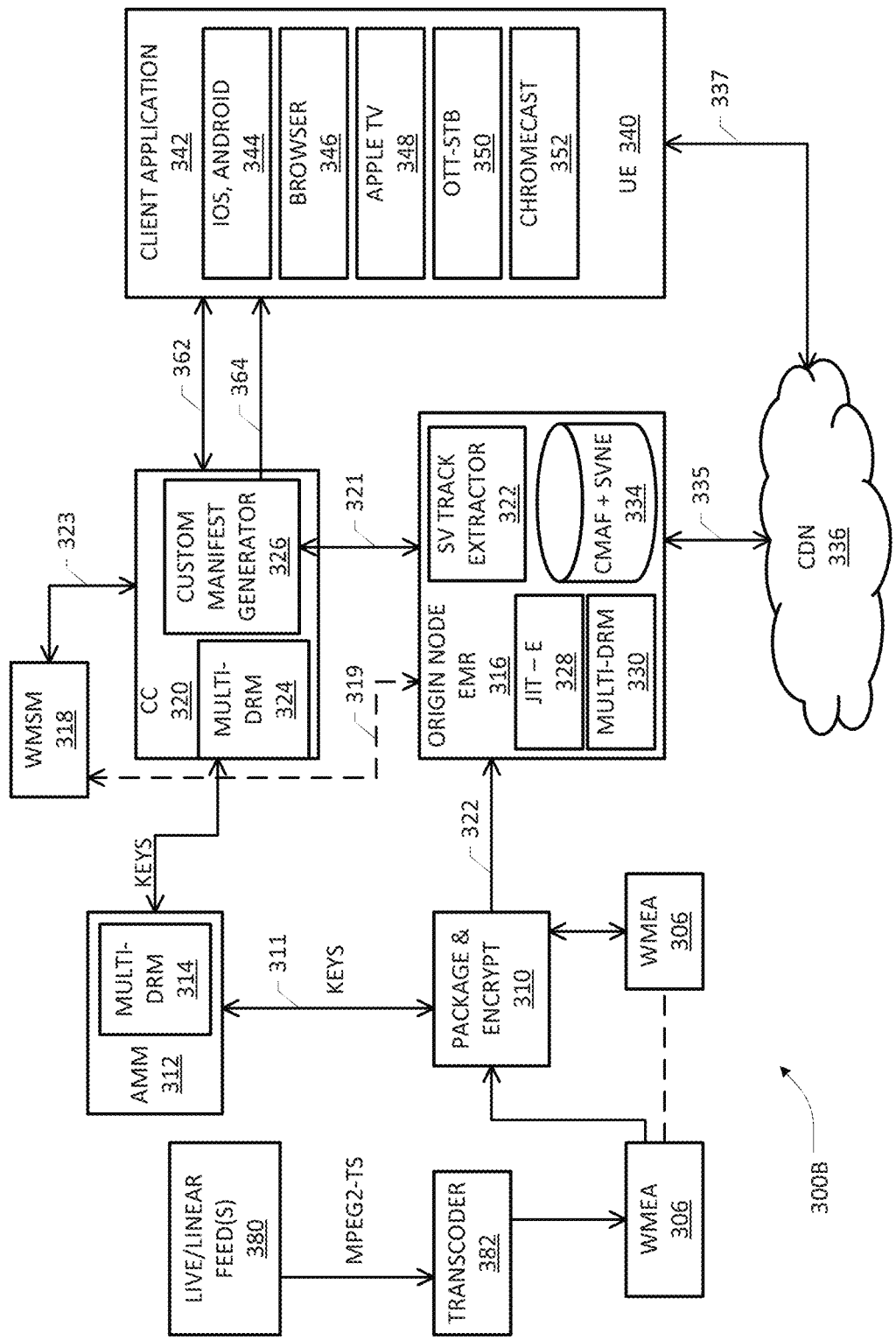

Turning now to FIGS. 3A and 3B, depicted therein are more particularized examples of network architectures for distributing watermarked Video-On-Demand (VOD) and live media content, respectively, provided in accordance with one or more embodiments of the invention, wherein composite CMAF segments having multiple tracks with various combinations of encryption and/or WM schemes may be implemented for purposes of the present patent application. A content management system or source (CMS) 302 of an example VOD streaming architecture 300A in FIG. 3A provides a VOD asset to a transcoder 304 that interfaces with a watermarking embedded agent (WMEA) 306. In one embodiment, the output 307 of transcoder 304 and embedded WM agent 306 may comprise multi-bitrate (MBR) files with TS variant elementary streams of audio/video (A/V) data, each having a particular watermarking payload, which can be up to preconfigured number of streams (k>1 streams). Here, the elementary streams may each comprise full sample streams. In another arrangement, MBR files may be generated such that a TS stream is provided with a particular watermarking payload whereas the rest of the streams may comprise sample variant elementary streams that may be based on sampling of the media data and watermarked differently (i.e., different watermarking payloads) and identified with corresponding wmIDs. MBR TS streams/files with main and watermarking elementary streams may be stored on a storage facility 308, which provides the assets via path 309 to a package/segmentation and encryption facility 310. In another variation, the output of transcoder/WMEA functionality may comprise ISOBMFF tracks, with a main track comprising the A/V data having a first watermarking payload and sample variant tracks comprising sampled A/V data having different watermarked payloads, similar to the arrangement above. In conformity with the generalized network architecture 100 of FIG. 1, a media manager facility 312 having multi-DRM functionality 314 is operative to provide various keys 311 to the package/segmentation and encryption facility 310, which is also interfaced with WMEA 306.

In accordance with the teachings herein, the package/segmentation and encryption facility 310 may be configured to generate a composite segment in a suitable container format, e.g., ISOBMFF/CMAF, CMZF, etc., wherein each composite segment may include different possible combinations of single/multiple encryption schemes with watermarking variant streams. For instance, a composite segment may include a single encryption scheme with watermarking sample variant streams as follows: a main track with 'cbcs' encryption; sample variant WM tracks with 'cbcs' (up to K variants) which can be from TS elementary streams having second watermarking payloads or from sample variant TS elementary streams having the second watermarking payloads. In a further illustration, a composite segment may include a main track with 'cenc' encryption; multiple sample variant WM tracks with 'cenc' (up to K variants) which can be from TS elementary streams having second watermarking payloads or from sample variant TS elementary streams having the second watermarking payloads. In a still further illustration, a composite segment may include a main track with 'cbcs' encryption; a sample variant track with 'cens' encryption; multiple sample variant WM tracks with 'cbcs' and/or 'cens' (up to K variants) formed from TS elementary streams having a second watermarking payload or from sample variant TS elementary streams having the second watermarking payloads. Various other combinations and/or sub-combinations of encryption schemes and watermarking payloads are also possible in still further implementations. Additionally or alternatively, the tracks in a composite segment may use same or different keys depending on the requirements of a particular DRM/publisher implementation.

The package/segmentation and encryption facility 310 may be further configured to generate appropriate metadata files, media presentation description (MPD) files, or manifest files in general, compliant with various streaming technologies, protocols, standards and specifications such as, e.g., HLS, HDS, DASH, etc. Also, in a further variation, the composite segments may be double-encrypted for further protection wherein the complete segment may be encrypted with a separate service key as previously set forth. In another embodiment, the unencrypted parts resulting from the sample pattern-based encryption schemes, e.g., where a predetermined amount, say 10%, of the data of the main/sample variant tracks is encrypted, may be encrypted using a different service key (e.g., specific to the device and service provider). Accordingly, in one variation, the composite segments may be double-encrypted with a service key using envelope mode encryption, wherein all bytes of each composite segment are encrypted with the service key. In another variation, where the main track and at least one sample variant track are encrypted using subsample pattern based encryption, the unencrypted portion of data of each composite segment may be encrypted with a service key.

The package/segmentation and encryption facility 310 may be further configured to upload the composite segments and manifest files to one or more downstream nodes such as, e.g., origin servers, EMR nodes, edge/regional distribution centers (E/RDCs), collectively shown at reference numeral 316, via any combination or sub-combination of managed, unmanaged, and/or federated networks, generally shown as upload path 322. Further, uploading of the composite segments and associated manifests may be effectuated to facilitate pre-provisioning/positioning of the content assets for streaming, electronic sell-through (EST), and/or download-to-own (DTO) transactions with respect to one or more client devices.

Client UE device 340 is representative of any type of media-consuming device having suitable client application(s), media player(s), decoder/decrypt module(s), and optionally variant extractor functionalities, as noted elsewhere in the present patent application. By way of illustration, client applications 342 may include IOS/Android application 344, browser application 346, Apple TV application 348, OTT-STB application 350, and Chromecast application 352, etc. Example client application 342 is operative to interface with a client controller (CC) element 320 configured with a multi-DRM module 324 and custom manifest generator 326 for obtaining a unique sequence of WM identifiers, authentication data (e.g., session authentication data in one implementation), media details and access keys with respect to a particular media content asset by issuing a suitable a roll/manifest request 362 to CC 320 over applicable access communication media path(s). A watermarking session manager (WMSM) module 318 is operative to interface with CC 320 via path 323 for facilitating the generation of a custom manifest based on the DRM, delivery format and program entitlements (e.g., playback rules (PBR)), wherein the manifest includes a unique signature of combination of the watermarking segment variants (up to K variants) corresponding to a requested media asset. Appropriate resource location pointers (e.g., a URL) associated with the unique segment variants may be configured to signal the particular watermarking stream the client is authorized to consume as well as other DRM parameters. The custom manifest may also be referred to as a watermarking (WM) manifest 364, which may be provided to the UE client device 340 via suitable communication media path(s).

Example client UE device 340 may be configured to use the custom manifest information and generate a media segment request based on the segment URL etc. which may be transmitted to the origin/EMR node 316 via a suitable communication path 337 coupled to a CDN 336 that may be associated with origin/EMR node 316. In accordance with the teachings herein, example origin/EMR node 316, which may be provided with a segment variant cache 334, is also interfaced with WMSM 318 via path 319 and with CC 320 via path 321 for coordinating the extraction of only those watermarked segment variants that the client UE device is authorized to consume. In one arrangement, a Just-In-Time Extractor (JIT-E) module 328 of the origin/EMR node 316 is operative with an SV extractor 332 to generate an extracted segment variant corresponding to the requested media content segment, preferably based on the delivery format, encryption scheme, DRM, etc. as well as the watermarking stream. Accordingly, example origin/EMR node 316 interfacing with WMSM 318 is also provided with a multi-DRM module 330. Example segment variants can be, for instance, as follows: CMAF/CBCS WM-A; CMAF/CBCS WM-B; CMAF/CENS WM-A; CMAF/CENS WM-B; HLS TS Sample AES WM-A; and HLS TS Sample AES WM-B, etc. An extracted segment variant, comprising one of the foregoing segment variants by way of illustration, may be provided to CDN 336 via path 335, which is then delivered to the client UE device 340 via the communication path 337 for rendering/playback.

In one arrangement, customized segment variants may be ordered in a custom manifest using a number of combinations from the WM variant tracks. In reference to one of the examples set forth hereinabove having a CMAF segment with main CBCS track with WM-A and sample variant CENS tracks with WM-B, a custom manifest 1 may order the segment variants as follows: segment 1 from WM variant A; segment 2 from WM variant B; segment 3 from WM variant B, and so on. Another custom manifest 2 may reference segment 1 from WM variant B; segment 2 from WM variant A; segment 3 from WM variant B, and so on. Accordingly, client UE device 340 may consume a media content asset based on receiving segments that may have different watermarking payloads on a segment by segment basis. In a still further embodiment, example custom manifests may be further protected with a manifest signature generated by a hash-based message authentication code (HMAC) using a Secure Hash Algorithm (SHA) scheme with a predetermined hash size, e.g., a scheme from the SHA-2 family comprising hash functions with digests (hash values) that are 224, 256, 384 or 512 bits: SHA-224, SHA-256, SHA-384, SHA-512, SHA-512/224, and SHA-512/256.

Turning to FIG. 3B, depicted therein is an example live/TSTV/nDVR media streaming architecture 300B wherein watermarked media content assets may be distributed/delivered according to an embodiment of the present invention. By way of illustration, a plurality of satellite/fiber linear/live feeds 380 provide source media content corresponding to one or more channels to appropriate encoders (not specifically shown), which encode/compress the media data into high quality bitrate streams, e.g., multicast streams, in a standard container format such as, e.g., MPEG2-TS or M2TS according to ISO/IEC 13818-1 (also synonymously referred to as MPEG-TS or MTS). One or more national/regional splicers may be provided in an example embodiment for inserting any secondary media content, e.g., advertisements, into the media streams before being processed by a headend encoder/transcoder module 382 in association with an embedded watermarking agent, e.g., WMEA 306, similar to the embodiment set forth in FIG. 3A. Skilled artisans will recognize that there is no external disk storage 308 in the streaming network architecture 300B of FIG. 3B. Accordingly, the watermarked/transcoded output streams (e.g., MBR TS elementary streams and sample variant TS elementary streams) are directly provided to the packager/encryption module 310. Example processing flow thereafter is substantially similar to the flow described hereinabove with respect to FIG. 3A, wherein substantially similar structures, components, elements, blocks and modules, and the like are configured and effectuated. The detailed description of FIG. 3A, including the client UE device side functionalities, modules, and manifest/segment requests, may therefore be equally applied to the embodiment of FIG. 3B, mutatis mutandis, which is not repeated here. It should be noted, however, that nDVR segments may be generated from the stored CMAF segment variants in the origin/delivery node storage 334, again using JIT-based (Just-in-Time Extractor) variant extraction similar to the embodiment of FIG. 3A in one example implementation. Further, whereas in VOD a custom manifest may provide a unique combination or sequence of watermarking IDs for the entire presentation of a requested media content asset (e.g., N segments), in live media scenarios, the CC functionality may be configured to generate a watermarking signature for a sliding window of segments only. In other words, multiple custom manifests may be provided to the client over the course of a live media presentation.

It will be apparent to skilled artisans upon reference hereto that the foregoing functionalities, modules and sub-modules of WMSM 318, CC 320 and origin/EMR 316 of example media streaming network architectures 300A and 300B set forth above may be (re)configured and/or (re)arranged in a number of ways, e.g., co-located, integrated, distributed or otherwise associated, within or in association with a regional/edge/delivery network, private/public or hybrid CDN, etc., depending on a particular implementation.

Figure 7A:
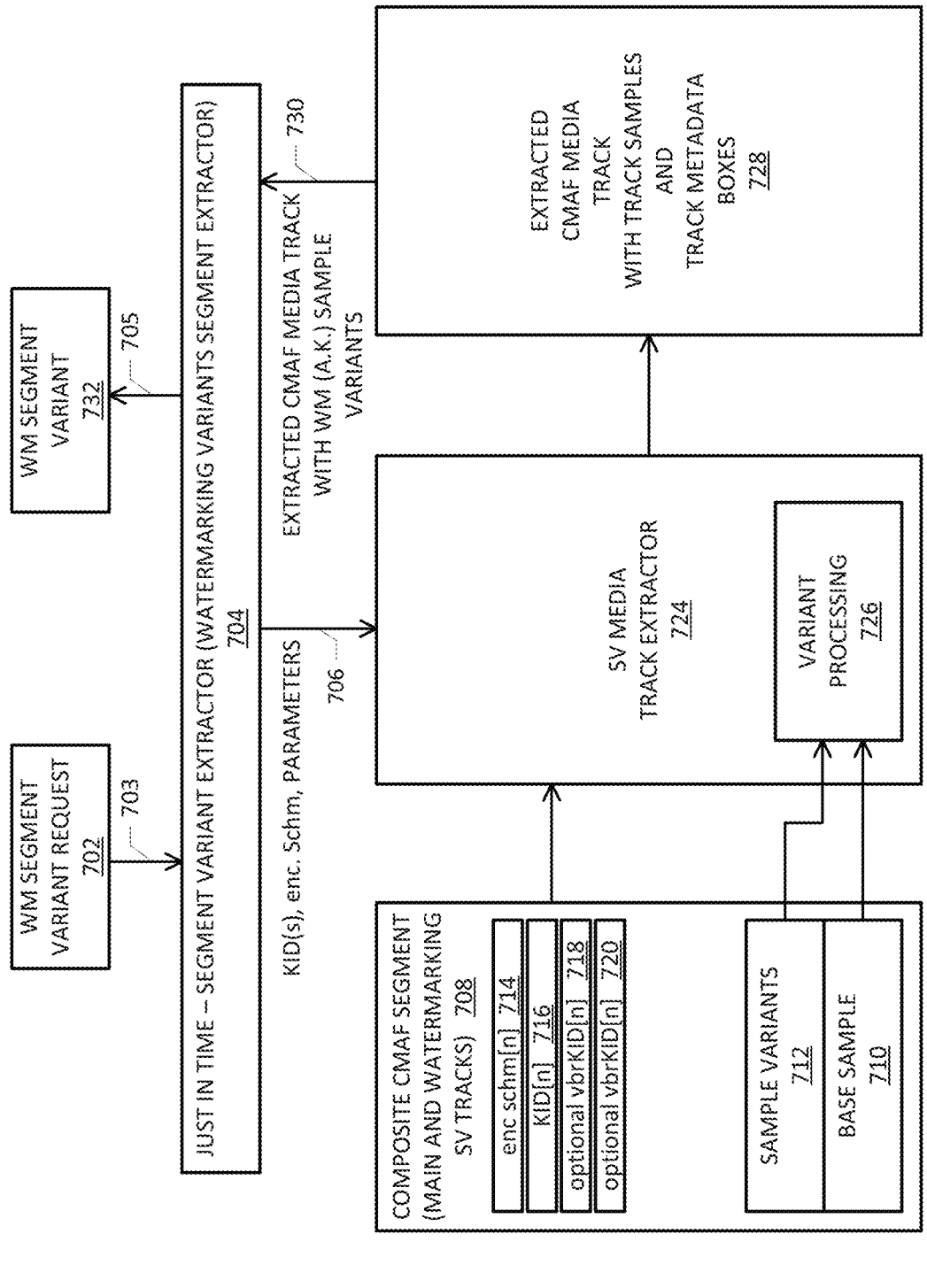
FIG. 7A depicts an variant extractor operative to extract a particular watermarked segment variant for purposes of an embodiment of the present invention.

Turning to FIG. 7A, depicted therein is an example variant extractor arrangement 700A operative to extract a particular watermarked segment variant assembled from a combination of the main track and one or more variant tracks for delivery to a client device for purposes of an embodiment of the present invention. FIG. 7B depicts a message flow diagram 700B that may be executed in association with an example variant extractor arrangement responsive to a client's media segment request according to an embodiment.

As noted previously, a composite CMAF segment may comprise a main track and several sample variant tracks (identified as 1, 2, . . . , K wmIDs)), where the sample variant tracks can be WM sample variants tracks and/or SVNE sample variant tracks (e.g., sample variant tracks carrying multiple/alternate encryption schemes). In one embodiment, a segment variant is a complete CMAF segment (or HLS MPEG-TS segment) with one specific variant of the watermarking payload/data. In another embodiment, a segment variant may comprise is a complete HLS MPEG-TS segment, with one specific variant of the watermarking payload/data. Preferably, a segment variant may be configured to have only one watermarking variant data regardless of the container format.

In general operation, a JIT extraction scheme may be implemented as a process or system to extract a segment variant from a composite segment that has multiple sample variant tracks, wherein the extraction functionality may be provided as software/firmware/hardware functionality that may be part of an origin/EMR node or configured as part of a client component (e.g., configured to perform extraction of a segment variant and feeding that segment to the player application of the client). Further, the track extraction from the composite segment in one example implementation may closely follow the SV media track extractor workflow defined in the ISO 23001-12 [SMPLEVAR] specification described in the SVNE patent application that has been incorporated by reference hereinabove.

An example composite CMAF segment 708 may therefore include a base/main sample 710 and a plurality of sample variants 712, in addition to various pieces of information such as encryption schemes 714, KIDs 716 (e.g., encKIDs), optional vmKIDs 718 and optional vbrKIDs 720 (e.g., for signaling variable byte ranges, etc.). An SV media track extractor 724 may include a variant processing module 726 for assembling samples. In one arrangement, JIT-E module 704 is configured to receive a segment variant request 702 from a client, preferably with the following parameterization including but not limited to: wmID data, e.g., WM variant A or B (or up to K), KIDs; HLS or DASH protocol format; CBCS, CENC or CENS encryption scheme; and multi-DRM metadata-device profile. Such a request may be effectuated via a path 703 that may involve an external network (in Origin/JIT-E implementation) or an internal path (in Client/JIT-E implementation). Access to the WM sample variants KID(s) and encryption scheme may therefore be provided via path 706, which is needed to extract the correct segment variant, whereupon the origin/JIT-E module (or client/JIT-E module) generates a segment variant that satisfies the request. As noted previously, a segment variant is a deliverable complete segment (for playback) that is derived/extracted from the stored composite CMAF segment that has multiple watermarking payload and alternate encryption scheme (SVNE) tracks. Extracted CMAF media track with sample variants 728 is received via path 730, whereupon the appropriate WM segment variant 732 is provided via path 705. Further, the extracted segment variant is ensured to have a suitable delivery format compatible with the client application (e.g., transformatting may be possible and/or needed in certain implementations). For example, where HLS TS segment delivery is supported, a segment variant may be HLS TS Sample-AES WM A/B/ . . . /K segment variant, requiring transformation from CMAF WM A/B/ . . . /K tracks to MPEG-TS A/B/ . . . /K elementary streams. In a still further variation where double encryption of the CMAF segments is provided, JIT-E functionality removes the double encryption wrapper during track extraction, if needed, prior to generating a segment variant.

Based on the foregoing, the extraction of a media track from an ISOBMFF file or segment that has media track and associated variant track(s) may be configured in one arrangement to satisfy a processing model as set forth in the following. (A) The extractor has access to KID(s) and protection scheme from the DRM system. (B) The extractor will search in the source media track (original media track), using Track Reference Type Box in the Track Reference Box Oren of the Track Box ('trak') which has the matching sample variant track reference type (for example 'cva2') and one or more track IDs that each correspond to a track_ID of a variant track that is to be referenced in the same file. The extractor adds these tracks to the sv_tracks_list, which is a list of tracks that are processed to extract the complete media track. (C) The extractor prepares the output ISOBMFF compliant media track by adding relevant track and encryption/watermarking metadata from main media track metadata. (D) The extractor verifies the protection schemes of the media track and sample variant tracks to make sure they are subsample pattern protection schemes. (E) The extractor starts processing media track fragments and samples upon obtaining access to media track fragment data and variant track(s) data. (F) For each sample in the media track, the extractor performs the variant processing (using a variant processor), for example as described in the SVNE patent application incorporated by reference hereinabove. At the end of the variant processing, a sample variant corresponding to the sample in the media track is assembled and will be added to the output media track along with relevant track and encryption/watermarking metadata. (G) The extractor repeats the step (F) for every sample in the track fragment and constructs the fragment for the output media track. (H) The extractor performs steps (E), (F) and (G) for all fragments in the source media track. (I) The resulting output track will be an ISOBMFF compliant file or segment with an ISOBMFF compliant media track.

In reference to the message flow diagram 700B of FIG. 7B, a client 760 sends a request 772 for segment variant to an origin server or EMR node 764, wherein the request URL may be parameterized with the base URL, DRM parameters including but not limited to device profile, DRM profile (encryption scheme, KIDs) and segment name, inter alia. Origin/EMR node 764 propagates the request as a message 774 to JIT-Extraction module 766 to handle the request. As noted previously, if the client 760 is configured to execute the extraction process, the parameterized request 772 via an external communications path to the origin/EMR node 764 may be avoided. Regardless of where executed, JIT-Extraction module or processor 766 may be configured to initiate extraction of segment variant from the corresponding composite CMAF segment by first finding or locating the corresponding composite CMAF segment and confirming that the composite CMAF segment has the requested encryption-scheme and watermarking sample variant tracks. Thereafter, JIT-Extraction processor 766 may be configured to validate the request parameters. JIT-Extraction processor 766 subsequently uses an SV track extractor 768 (consistent with the foregoing extractor model) via interface 776 to extract the media track from the main track and the corresponding watermarking track. The SV extractor uses KIDs and encryption scheme to find the correct set of samples for the extracted media track. As previously noted, a composite CMAF tracks can be any of the following: (i) Main track; (ii) Sample variant track for main track with alternate encryption scheme; (iii) Watermarking (1, . . . , K wmIDs) sample variants track; and (iv) Watermarking (1, . . . , K wmIDs) sample variants track with alternate encryption scheme(s). The SV extractor 768 extracts the media track with the samples from the main media track and one of the corresponding sample variant tracks (i.e., one of the (ii), (iii) or (iv) from the aforementioned list). The SV extractor 768 constructs a complete media track with all the corresponding ISOBMFF/CMAF track metadata boxes and all the common encryption related metadata boxes, which is returned via message interface 778 to JIT-Extraction processor 766. Upon receipt, JIT-Extraction processor 766 uses the extracted media track and generates a complete segment variant file to be returned to the client 762, via the origin/EMR node 764, as indicated by message paths 782, 784, whereupon the complete segment variant is decrypted and decoded as set forth in the SVNE patent application, incorporated by reference hereinabove. It should be noted that if the request segment variant format is MPEG-2-TS (for HLS TS) JIT-Extraction processor 766 transformats the CMAF segment variant file to HLS TS segment file. Further, where the extraction process takes place within the client 762, the foregoing messaging paths are essentially internal to the client 762 rather than the origin/EMR node 764 returning the segment variant back to client 762.

Figure 10:
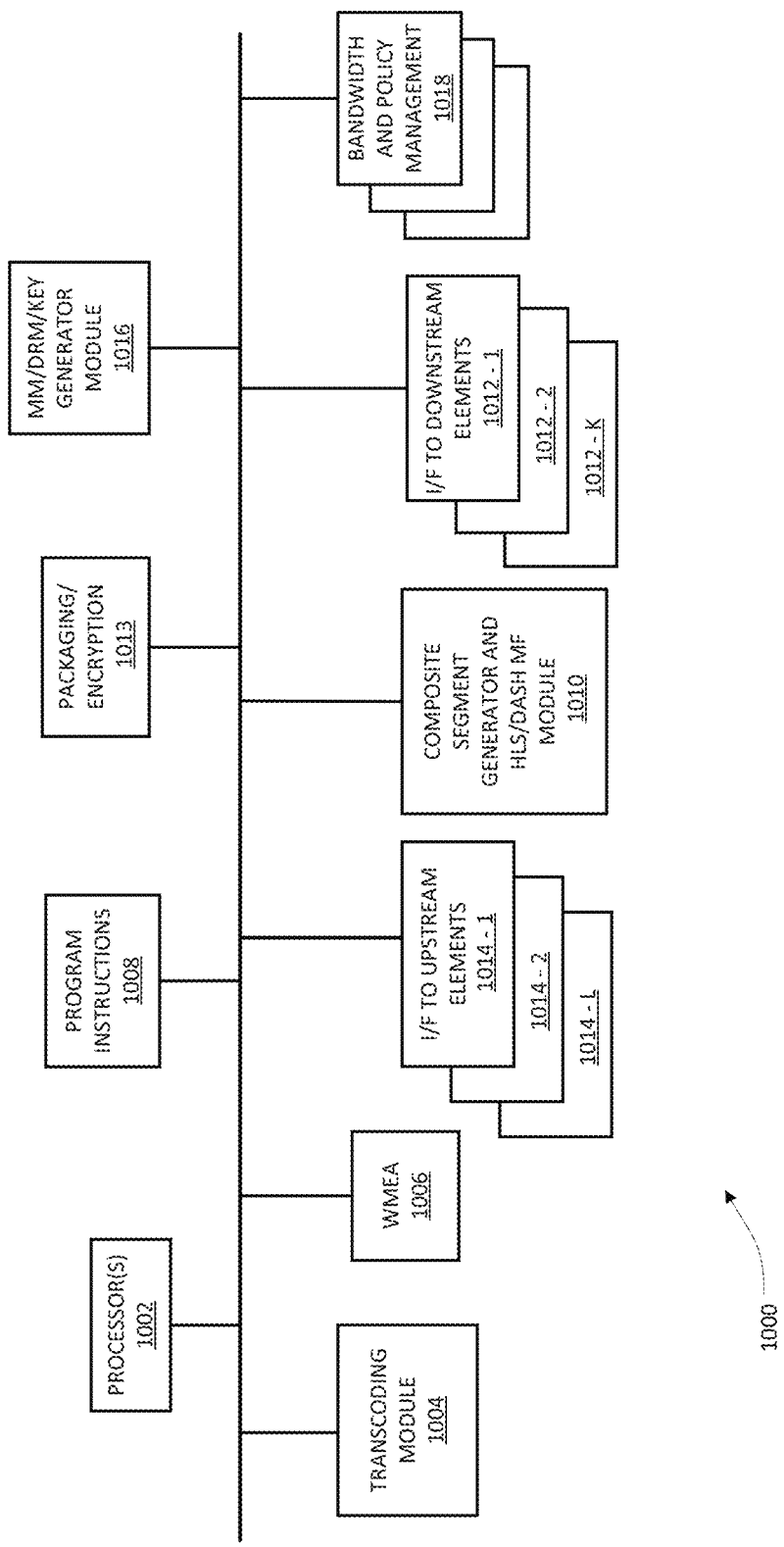
FIG. 10 depicts a block diagram of an apparatus that may be configured or arranged as a network element or node for packaging media content assets for purposes of one or more embodiments of the present patent application.

FIG. 10 depicts a block diagram of an apparatus 1000 that may be configured or arranged as a network element, subsystem or node for facilitating one or more aspects of media containerization and distribution according to an embodiment of the present patent disclosure. Depending on implementation and/or network architecture of a media communications network, apparatus 1000 may be configured in different ways suitable for operation at multiple hierarchical levels, e.g., at a super headend node, regional headend node, video hub office node, ABR origin server node, central or regional or edge distribution node in a CDN, etc., on the basis of where source media feeds or other content sources are injected into an example deployment. Accordingly, suitable network interfaces, e.g., I/F 1014-1 to 1014-L, operative for effectuating communications with other network infrastructure elements and databases (e.g., source feeds, global databases for storing encoded media fragments, metadata/manifest files, DRM entities, media management nodes, etc.) as well as interfaces 1012-1 to 1012-K for effectuating communications sessions with one or more downstream nodes, e.g., EMRs, origin servers, CDNs, RDCs, multicast ABR (MABR) network elements, etc., may be provided as part of the apparatus 1000. One or more processors 1002 may be provided as part of a suitable computer architecture for providing overcall control of the apparatus 1000, which processor(s) 1002 may be configured to execute various program instructions stored in appropriate memory modules or blocks, e.g., persistent memory 1008 as well as program instructions forming or comprised of additional modules or blocks specific to encoding/transcoding, media segmentation, encryption, composite segment containerization, etc. By way of illustration, an encode/transcode block 1004 is operative for generating multi-bitrate TS elementary streams (as main and variant track streams), preferably with multiple watermarking payloads, in association with WMEA module 1006. A multi-encryption and packaging block 1013 is operative for encrypting and packaging the content into a composite segment format, wherein different tracks comprise one or more encryption schemes and/or one or more watermarking payloads according to a particular watermarking scheme as described in detail hereinabove. The packaging block 1013 may also include appropriate functionality to generate HLS/DASH manifests effectuating various levels/types of formatting/containerization and associated manifest generation for purposes of one or more embodiments of the present invention. Depending on implementation, an embodiment of apparatus 1000 may also include or otherwise be associated with a media manager/DRM module 1016 operative to provide various encryption keys, KIDs, and other DRM data for individualizing the tracks of a composite segment as set forth in detail hereinabove. In still further additional or alternative arrangements, a content push policy management module, a bandwidth and content policy management module, program entitlements, etc., collectively shown as modules or blocks 1018, may also be provided as part of a backend management node in an example network architecture.

Figure 11:
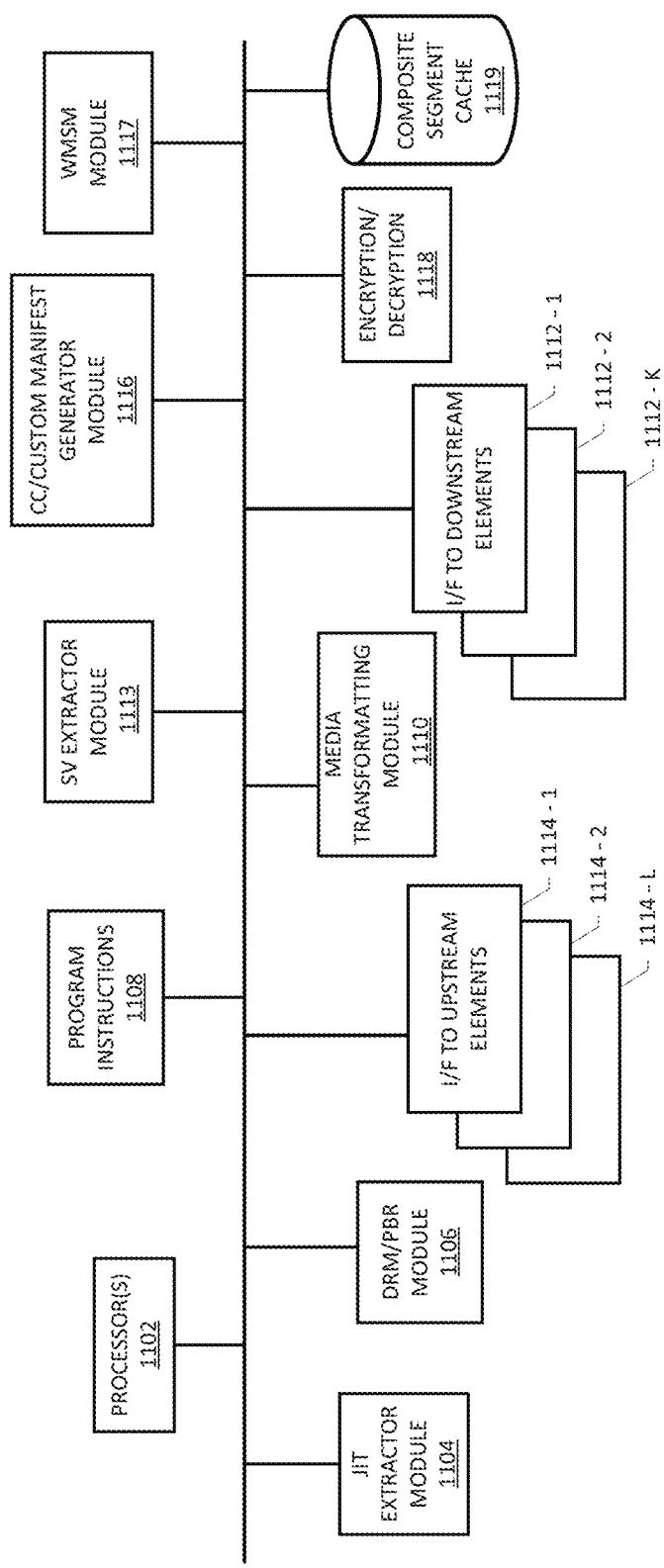
FIG. 11 depicts a block diagram of an apparatus that may be configured or arranged as an EMR element or origin server node operating at different hierarchical levels of a media network for purposes of one or more embodiments of the present patent application.

FIG. 11 depicts a block diagram of an apparatus 1100 that may be configured or arranged as a network element, subsystem or node for facilitating one or more aspects of a delivery/origin server node or EMR component associated with a CDN or other network infrastructure according to an embodiment of the present patent disclosure. Depending on implementation and/or network architecture of a media communications network, apparatus 1100 may be configured in different arrangements suitable for operation at multiple hierarchical levels, including at the CDN, edge delivery network, or a premises gateway node, as previously noted. Accordingly, various network interfaces, e.g., I/F 1114-1 to 1114-L, operative for effectuating communications with other network infrastructure elements, DRM entities, other origin servers, client controller nodes, watermarking session management nodes, and cache databases as well as interfaces 1112-1 to 1112-K for effectuating communications sessions with one or more downstream nodes, e.g., including lower-level EMRs, origin servers, CDNs, ICC/FCC servers, premises gateway nodes, STBs, reach devices, etc., may be provided as part of the apparatus 1100 depending on the network hierarchical level and/or integration. One or more processors 1102 may be provided as part of a suitable computer architecture for providing overcall control of the apparatus 1100, which processor(s) 1102 may be configured to execute various program instructions stored in appropriate memory modules or blocks, e.g., persistent memory 1108, including additional modules or blocks specific to custom WM manifest generation, segment variant extraction, media transformatting (MFX), etc. as described in detail hereinabove. For example, such modules may include EMR/MFX module 1110, SV extractor module 1113, JIT-Extractor module 1104, client controller with custom manifest generation module 1116 as well as a WMSM module 1117. EMR functionality may also include a sample variant extractor component as part of program instructions configured to extract a complete elementary stream with data from sample variant and main elementary stream samples, which will have the data encrypted with select encryption scheme(s) and having the watermarking payload(s) of the sample variant elementary stream as previously set forth.

A DRM/PBR module 1106 may be provided to interface with JIT-E module 1104 and SV extractor module 1113 in order to ensure that applicable DRM and/or PBR constraints are applied with respect to processing client requests for specific media, which may be stored in local caches 1119 in some implementations. An encryption/decryption block 1118 may be included in an embodiment for operation in association with a media controller module and media transformatter module 1110 for purposes of one or more embodiments of the present invention, along with facilitating additional cryptographic functionalities, e.g., double-encryption, as well as for effectuating media transformation, trans-containerization, etc. In another arrangement, channel change functionality may also be included for operation with a burst generator with respect to media repair/recovery and channel changing as set forth in the CMZF patent application incorporated by reference hereinabove.

Figure 12:
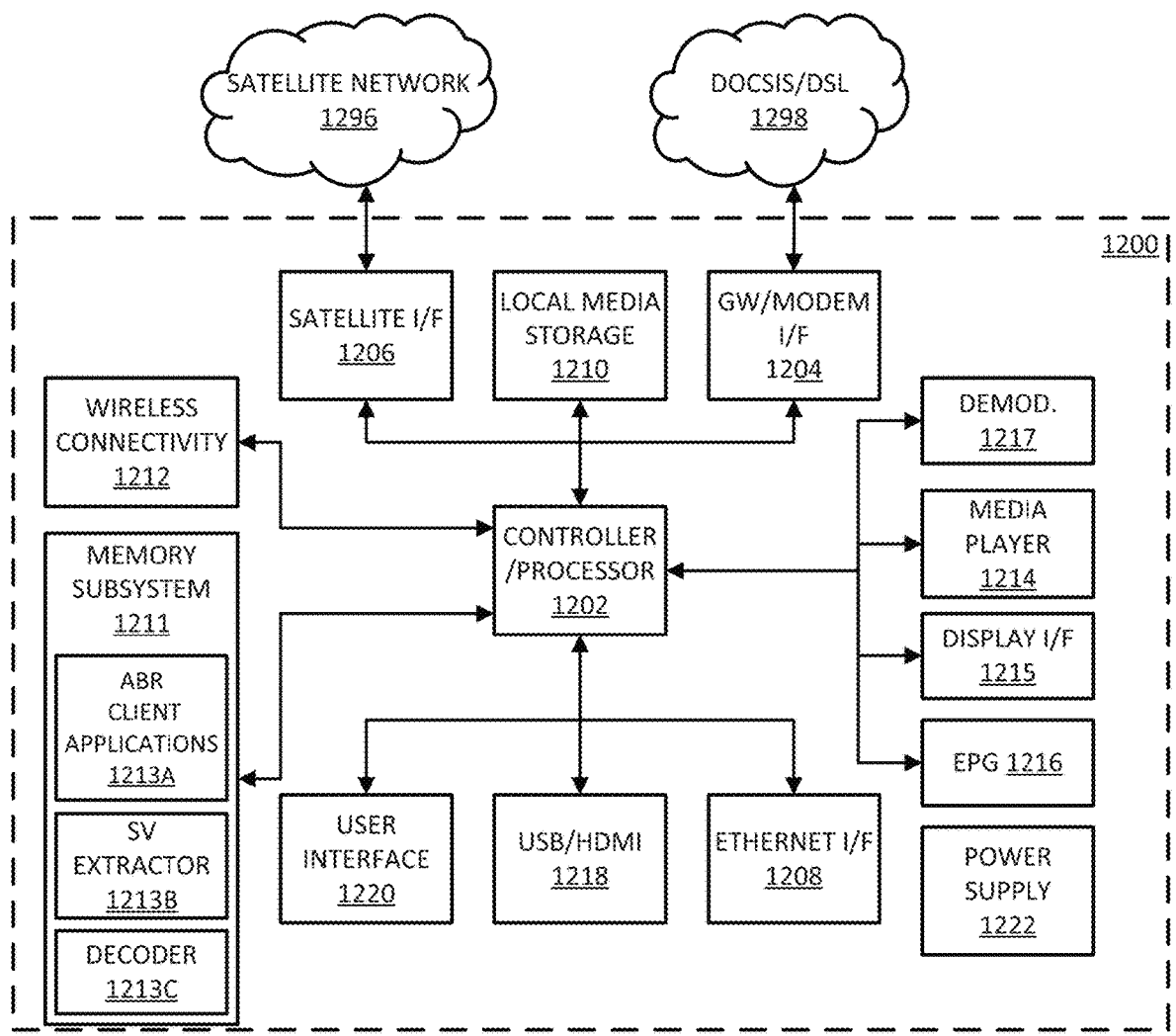
FIG. 12 depicts a block diagram of an apparatus that may be configured or arranged as a premises device or end user device for purposes of the present patent application.

FIG. 12 is a block diagram of an example client UE device or subscriber station 1200 configured for performing various client-side processes according to one or more embodiments of the present patent disclosure. Client device 1200 is generally representative of a plurality of UE devices, e.g., NXG STBs, legacy STBs, reach devices, etc., shown in one or more Figures described above, and may include appropriate hardware/software components and subsystems configured for performing any of the device-side processes (either individually or in any combination thereof) with respect to local cache access, WM manifest request generation, content segment request generation, metadata parsing, HTTP proxy control, sample variant extraction/processing in conjunction with media segment/stream retrieval and rendering, for purposes of the present patent application, such as, e.g., facilitating MFX as well as media decrypt/decode and/or sample variants extractor functionality, among others, depending on implementation. One or more microcontrollers/processors 1202 are provided for the overall control of the client device 1200 and for the execution of various stored program instructions embodied in a persistent memory 1213, e.g., as a streaming client application having cache discovery capability and/or browser proxy agent, etc., that may be part of a memory subsystem 1211 of the subscriber station 1200. Accordingly, suitable ABR streaming client applications 1213A as well as SV extractor functionality 1213B and decode/decrypt functionality 1213C may also be provided as part of the memory subsystem 1211 that may be executed in association with one or more media players 1214. Controller/processor complex referred to by reference numeral 1202 may also be representative of other specialty processing modules such as graphic processors, video processors, digital signal processors (DSPs), and the like, operating in association with suitable video and audio interfaces (not specifically shown). Appropriate network interfaces such as network I/F modules 1204 and 1206 involving or operating with tuners, demodulators, descramblers, MPEG/H.264/H.265 decoders/demuxes may be included for processing and interfacing with IPTV and other content signals received via a DSL/CMTS network 1298 or a satellite network 1296. Where an STB is configured as an example client device or application, suitable demodulators 1217 (e.g., may include NTSC demodulator and/or ATSC/PAL demodulator, and the like) as well as electronic program guides (EPG) 1216 may also be included. As noted above, one or more media players 1214 may be provided for operating in conjunction with the other subsystems of the client device 1200, which may be further configured with subsystems for facilitating user control over media playback, including channel change requests and any trick mode operations. Example media players may be configured to operate with one or more A/V coder/decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like.

Other I/O or interfaces such as a display interface 1215, touch screen or keypad interface 1220, USB/HDMI ports 1218, Ethernet I/F 1208, and short-range and wide area wireless connectivity interfaces 1212 may also be provided depending on device configuration. A hard disk drive (HDD) or local DVR system 1210 may be included in an STB implementation for local storage of various program assets. A suitable power supply block 1222 may include AC/DC power conversion to provide power for the device 1200. It should be appreciated that the actual power architecture for the subscriber device 1200 may vary by the hardware platform used, e.g., depending upon the core SoC (System-on-Chip), memory, analog front-end, analog signal chain components and interfaces used in the specific platform, and the like.

One skilled in the art will recognize that various apparatuses, subsystems, functionalities/applications and/or one or more network elements as well as the underlying network infrastructures set forth above may be architected in a virtualized environment according to a network function virtualization (NFV) architecture in additional or alternative embodiments of the present patent disclosure. For instance, various physical resources, databases, services, applications and functions executing within an example network of the present application may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of the example network architectures, apparatuses and systems disclosed herein may be virtualized as set forth above and/or architected in a cloud-computing environment comprising a shared pool of configurable virtual resources. Various pieces of hardware/software, e.g., encoders/transcoders, encryption systems and schemes, segmentation mechanisms, media asset packaging/containerization, composite segment generation, EMR/MFX functionality, etc., as well as platforms and infrastructure of NDCs, RDCs, origin servers, client controller/WMSM nodes, MABR network elements may be implemented in a service-oriented architecture, e.g., Software as a Service (SaaS), Platform as a Service (PaaS), infrastructure as a Service (IaaS), etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A method of consuming watermarked media content, the method comprising:
   generating, at a client device, a manifest request with respect to accessing a watermarked media content asset;
   receiving a custom manifest including a watermarking signature comprising a unique sequence of segment variants relating to the media content asset;
   responsive to the custom manifest, generating a segment request to an origin server having a plurality of composite segments for the media content asset, each composite segment including a segment portion of a main ISOBMFF track and a corresponding portion of at least one ISOBMFF sample variant track, wherein the main ISOBMFF track contains a first watermarking payload and the at least one ISOBMFF sample variant track contains at least a second watermarking payload, the first watermarking payload and the at least a second watermarking payload each identified by a respective watermarking identifier (wmID); and
   upon determining that the client device includes a variant extractor module:
   receiving by the client device a composite segment from the origin server, the composite segment including a particular watermarked segment variant authorized to be consumed;
   extracting and assembling the particular watermarked segment variant from a combination of the main ISOBMFF track and the at least one ISOBMFF sample variant track based on associated watermarking IDs (wmIDs) to which the client device has access to form an output composite segment that is assembled only from the main ISOBMFF track and the extracted particular watermarked segment variant; and decrypting and decoding the output composite segment for rendering by a player application of the client device.

2. The method as recited in claim 1, further comprising:

determining if the client device does not include a variant extractor module;

if so, receiving by the client device a composite segment that is assembled by the origin server only from a combination of the main ISOBMFF track and the particular watermarked segment variant that has been extracted from the at least one ISOBMFF sample variant track based on associated watermarking IDs (wmIDs); and decrypting and decoding the received composite segment from the origin server for rendering by the player application of the client device.

3. The method as recited n claim 1, wherein the main ISOBMFF track of the media content asset is encrypted using a first encryption scheme and the at least one ISOBMFF sample variant track is encrypted using at least a second encryption scheme, and further wherein the first encryption scheme applied to the main ISOBMFF track and the at least a second encryption scheme applied to the at least one ISOBMFF sample variant track are identified by respective encryption Key identifiers (encKIDs).

4. An apparatus, comprising:

one or more processors;

a plurality of network interfaces configured to receive media content assets from one or more headend nodes, wherein a media content asset comprises a plurality of composite segments, each composite segment including a segment portion of a main ISOBMFF track and a corresponding portion of at least one ISOBMFF sample variant track, the ISOBMFF sample variant track including variant data for a subset of samples of the main ISOBMFF track, and wherein the main ISOBMFF track contains a first watermarking payload and the at least one ISOBMFF sample variant track contains a second watermarking payload, the first watermarking payload and the second watermarking payload each identified by a respective watermarking identifier (wmID); and one or more persistent memory modules having program instructions stored thereon which, when executed by the one or more processors, perform the following;

responsive to receiving a manifest request from a client device with respect to accessing a watermarked media content asset, generating a custom manifest including a watermarking signature comprising a unique sequence of segment variants relating to the media content asset;

receiving a segment request from the client device to access a particular watermarked segment variant;

determining whether the client device includes a variant extractor module, and upon determining that the client device includes a variant extractor module, transmitting a composite segment including the particular watermarked segment variant to the client device authorized to be extracted for playback by the client device.

5. The apparatus as recited in claim 4, wherein the program instructions further comprise instructions for determining that the client device does not include a variant extractor module, and responsive to the determination, assembling a composite segment only from a combination of the main ISOBMFF track and the particular watermarked segment variant that has been extracted from the at least one ISOBMFF sample variant track of the composite segment based on associated watermarking IDs (wmIDs) and transmitting the assembled composite segment to the client device for playback by the client device.

6. The apparatus as recited in claim 4, wherein the main ISOBMFF track of the media content asset is encrypted using a first encryption scheme and the at least one variant track is encrypted using at least a second encryption scheme, and further wherein the first encryption scheme applied to the main ISOBMFF track and the at least a second encryption scheme applied to the at least one ISOBMFF sample variant track are identified by respective encryption Key Identifiers (encKIDs).

7. The apparatus as recited in claim 4, wherein the program instructions further comprise instructions for transformatting the assembled composite segment variant from a first container format to a delivery container format compatible with the client device.

8. A user equipment (UE) device configured to consume watermarked media content, the UE device comprising:

a processor; and a persistent memory module having program instructions thereon which, when executed by the processor, perform the following:

generating a manifest request to a client controller node with respect to accessing a watermarked media content asset;

receiving a custom manifest including a watermarking signature comprising a unique sequence of segment variants relating to the media content asset;

responsive to the custom manifest, generating a segment request to an origin server having a plurality of composite segments for the media content asset, each composite segment including a segment portion of a main ISOBMFF track and a corresponding portion of at least one ISOBMFF sample variant track, wherein the main ISOBMFF track contains a first watermarking payload and the at least one ISOBMFF sample variant track contains at least a second watermarking payload, the first watermarking payload and the at least a second watermarking payload each identified by a respective watermarking identifier (wmID); and further performing, upon determining that the UE device includes a variant extractor module:

receiving a composite segment from the origin server, the composite segment including a particular watermarked segment variant authorized to be consumed;

extracting and assembling the particular watermarked segment variant from a combination of the main ISOBMFF track and the at least one ISOBMFF sample variant track based on associated watermarking IDs (wmIDs) to which the UE device has access to form an output composite segment that is assembled only from the main ISOBMFF track and the extracted particular watermarked segment variant; and decrypting and decoding the output composite segment for rendering by a player application of the UE device.

9. The UE device as recited in claim 8, wherein the program instructions further comprise instructions for determining that the UE device does not include a variant extractor module, and responsive to the determination, receiving a composite segment that is assembled by the origin server only from a combination of the main ISOBMFF track and the particular watermarked segment variant that has been extracted from the at least one ISOBMFF sample variant track based on associated watermarking IDs (wmIDs); and decrypting and decoding the received composite segment from the origin server for rendering by the player application of the UE device.

* * * * *